(12) United States Patent
Muyzert et al.

(10) Patent No.: US 7,379,386 B2
(45) Date of Patent: May 27, 2008

(54) WORKFLOW FOR PROCESSING STREAMER SEISMIC DATA

(75) Inventors: Everhard Johan Muyzert, Girton (GB); Johan Olof Anders Robertsson, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/641,416

(22) Filed: Dec. 19, 2006

(65) Prior Publication Data
US 2008/0049551 A1    Feb. 28, 2008

Related U.S. Application Data

(60) Provisional application No. 60/807,184, filed on Jul. 12, 2006.

(51) Int. Cl.
*G01V 1/28* (2006.01)
(52) U.S. Cl. .......................... 367/63; 702/17
(58) Field of Classification Search .................. 367/43, 367/63; 181/111; 702/17, 18
See application file for complete search history.

(56) References Cited

U.S. PATENT DOCUMENTS

| | | | |
|---|---|---|---|
| 4,437,175 A | 3/1984 | Berni | |
| 4,520,467 A | 5/1985 | Berni | |
| 4,935,903 A * | 6/1990 | Sanders et al. | 367/24 |
| 5,621,699 A * | 4/1997 | Rigsby et al. | 367/22 |
| 5,774,416 A * | 6/1998 | Sadek et al. | 367/24 |
| 6,446,008 B1 | 9/2002 | Ozbek | |
| 6,512,980 B1 * | 1/2003 | Barr | 702/1 |
| 6,535,818 B1 * | 3/2003 | Baeten | 702/17 |
| 6,684,160 B1 * | 1/2004 | Ozbek et al. | 702/17 |
| 2004/0073373 A1 * | 4/2004 | Wilson | 702/16 |
| 2005/0119831 A1 * | 6/2005 | Ferber | 702/14 |
| 2005/0190650 A1 * | 9/2005 | Ferber et al. | 367/43 |
| 2005/0195686 A1 | 9/2005 | Vaage et al. | |
| 2005/0249040 A1 * | 11/2005 | Luc et al. | 367/178 |
| 2006/0239117 A1 * | 10/2006 | Singh et al. | 367/20 |

FOREIGN PATENT DOCUMENTS

WO    WO 2004/029662 A1    4/2004

OTHER PUBLICATIONS

Quigley et al. Integration Issues for Single Point Data. 27th Annu. Explor. Geophys. Conv. v. 25, No. 4, pp. 97-100. Oct. 2004.*
Amundsen, Roesten, Robertsson & Kragh, "Rough-sea deghosting of single streamer seismic data using pressure gradient approximations," *Geophysics*,70(1):V1-V9, 2005.

(Continued)

*Primary Examiner*—Deandra M Hughes
(74) *Attorney, Agent, or Firm*—Jeffrey A. Pyle; Liangang (Mark) Ye; Jeffrey E. Griffin

(57) ABSTRACT

A method includes conditioning a set of multicomponent seismic data and sensor orientation data, the multicomponent seismic data including pressure data and particle motion data, acquired in a towed array, marine seismic survey; digital group forming the conditioned pressure data, a vertical particle motion component of the conditioned particle motion data, and the conditioned sensor orientation data; and summing the digitally group formed pressure data and the digitally group formed vertical particle motion component.

40 Claims, 8 Drawing Sheets

OTHER PUBLICATIONS

MacKay, D.J., Information theory, inference and learning algorithms, pp. 549-551, 2003.

Melbø, Robertsson & van Manen, "PZ calibration by applying the equation of motion to critically refracted waves," SEG Int'l Exposition and 72nd Annual Meeting, Salt Lake City, Utah, Oct. 6-11, 2002.

Muijs, et al., "Data-driven adaptive decomposition of multicomponent seabed recordings," 73rd Annual Society of Exploration Geophysicists (SEG) Meeting, Dallas, 2003.

Robertsson & Kragh, "Rough-sea deghosting using a single streamer and a pressure gradient approximation," Geophysics, 67(6):2005-2011, 2002.

Schalkwijk, "Decomposition of multicomponent ocean bottom data into P- and S-waves," Ph.D. thesis, Delft University, 2001.

* cited by examiner

WORKFLOW FOR PROCESSING STREAMER SEISMIC DATA

The current non-provisional patent application claims the priority of co-pending provisional patent application, Ser. No. 60/807,184, filed on Jul. 12, 2006 by the same inventors, with the same title.

BACKGROUND OF THE INVENTION

I. Field of the Invention

The present invention pertains to multicomponent, towed-array, marine seismic surveys, and, more particularly, to a technique for collecting and processing data acquired in such a survey.

II. Description of the Related Art

Seismic exploration involves surveying subterranean geological formations for hydrocarbon deposits. A survey typically involves deploying acoustic source(s) and acoustic sensors at predetermined locations. The sources impart acoustic waves into the geological formations. The acoustic waves are sometime also referred to as "pressure waves" because of the way they propagate. Features of the geological formation reflect the pressure waves to the sensors. The sensors receive the reflected waves, which are detected, conditioned, and processed to generate seismic data. Analysis of the seismic data can then indicate the presence or absence of probable locations of hydrocarbon deposits.

Some surveys are known as "marine" surveys because they are conducted in marine environments. Note that marine surveys may be conducted not only in saltwater environments, but also in fresh and brackish waters. Marine surveys come in at least two types. In a first, an array of streamers and sources is towed behind a survey vessel. In a second type, an array of seismic cables, each of which includes multiple sensors, is laid on the ocean floor, or sea bottom, and a source is towed from a survey vessel.

Historically, towed array, marine seismic surveys only employed pressure waves and the receivers detected any passing wavefront. This includes two types of wavefronts. The first are those reflected upward to the receivers from the geological formation. The second are those that are reflected from the surface of the water. The upward traveling wavefronts contain desirable, useful information and the downward traveling wavefronts do not. This sometimes leads to difficulties in processing.

The art has therefore recently begun moving to "multicomponent" surveys in which, for example, not only is the passing of a wavefront detected, but also the direction in which it is propagating. Knowledge of the direction of travel permits determination, for example, of which wavefronts are traveling upward and will yield useful information and which are traveling downwards and will yield undesirable information if confused with upwards traveling waves. Multicomponent towed-array surveys include a plurality of receivers that detect not only the pressure wave, but also the velocity, or time derivatives (i.e., acceleration) thereof, of the passing wavefront. These receivers will hereafter be referred to as "particle motion sensors" because they measure the velocity or acceleration of displaced particles. The pressure sensor is typically a hydrophone, and the particle motion sensors are typically geophones or accelerometers.

The technology is currently immature, however, in many respects. Attention has largely been focused on the equipment and acquisition. However, little attention has been given to the processing. More particularly, the seismic data resulting from this kind of acquisition is useful in conventional types of processing such as group forming, stacking, velocity analysis, moveout correction, etc., by which analysis is typically performed. Nevertheless, this type of acquisition presents unique challenges in pre-processing such data that have not been addressed by the art because the challenges have not previously been presented by conventional acquisition techniques.

The present invention is directed to resolving, or at least reducing, one or all of the problems mentioned above.

SUMMARY OF THE INVENTION

The invention includes, in its various aspects and embodiments, a method for pre-processing seismic data. More particularly, the method comprises: conditioning a set of multicomponent seismic data and sensor orientation data, the multicomponent seismic data including pressure data and particle motion data, acquired in a towed array, marine seismic survey; digital group forming the conditioned pressure data, a vertical particle motion component of the conditioned particle motion data, and the conditioned sensor orientation data; and summing the digitally group formed pressure data and the digitally group formed vertical particle motion component. In other aspects, the invention includes a program storage medium encoded with instructions that, when executed by a computing device, perform such a method and a computing apparatus programmed to perform such a method.

BRIEF DESCRIPTION OF THE DRAWINGS

The invention may be understood by reference to the following description taken in conjunction with the accompanying drawings, in which like reference numerals identify like elements, and in which:

FIG. 8-FIG. 10 illustrate a first digital group forming technique as may be used in the implementation of FIG. 5, in which:

FIG. 8 is a general block diagram of an adaptive beamformer as may be used in digital group forming in one particular embodiment;

FIG. 9 depicts an exemplary region preserved by the adaptive beamformer of FIG. 8;

FIG. 10 illustrates the definition of a constraint matrix in the digital group forming of the illustrated embodiment.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
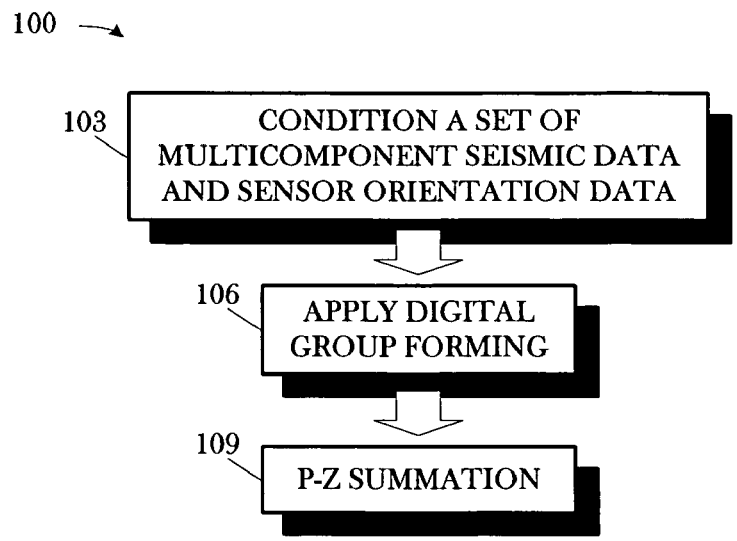
FIG. 1 illustrates one particular embodiment of a method practiced in accordance with the present invention.
Figure 2:
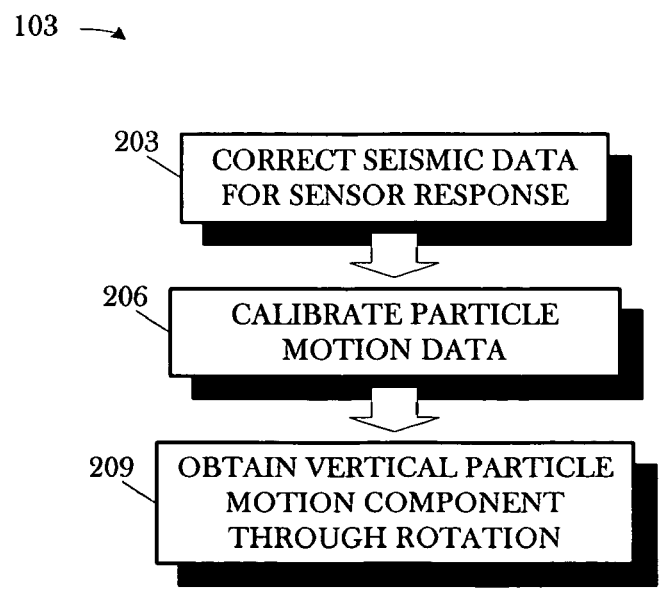
FIG. 2 illustrates the data conditioning in the embodiment of FIG. 1.

Turning now to the drawings, FIG. 1 illustrates a method 100 practiced in accordance with one aspect of the present invention. The method 100 begins by conditioning (at 103) a set of multicomponent seismic data and sensor orientation data, the multicomponent seismic data including pressure data and particle motion data, acquired in a towed array, marine seismic survey. In the illustrated embodiment, the conditioning (at 103) includes, as shown in FIG. 2, correcting (at 203) the multicomponent seismic data for sensor response, calibrating (at 206) the particle motion data, and rotating (at 209) the particle motion data using the sensor orientation data to obtain the vertical velocity component, respectively.

Returning to FIG. 1, the method 100 then applies (at 106) digital group forming to the conditioned pressure data, the vertical component of the conditioned particle motion data, and the conditioned sensor orientation data. The digitally group formed pressure data ("P data") and vertical particle motion component ("Z data") are then summed (at 109). The summed P-Z data and the vertical particle motion component can then further processed utilizing conventional techniques, such as the one disclosed in Barr F., J., and Saunders, J. I., "Attenuation of water-column reverberations using pressure and velocity detectors in a water-bottom cable", 59th Ann. Internat. Mtg., Soc. Expl. Geophys. 653-656 (1989).

In other aspects, the invention includes a program storage medium encoded with instructions that, when executed by a computing apparatus, performs a method such as the method 100 and a computing apparatus programmed to perform such a method. Thus, in one aspect, the present invention is a software implemented method. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 3:
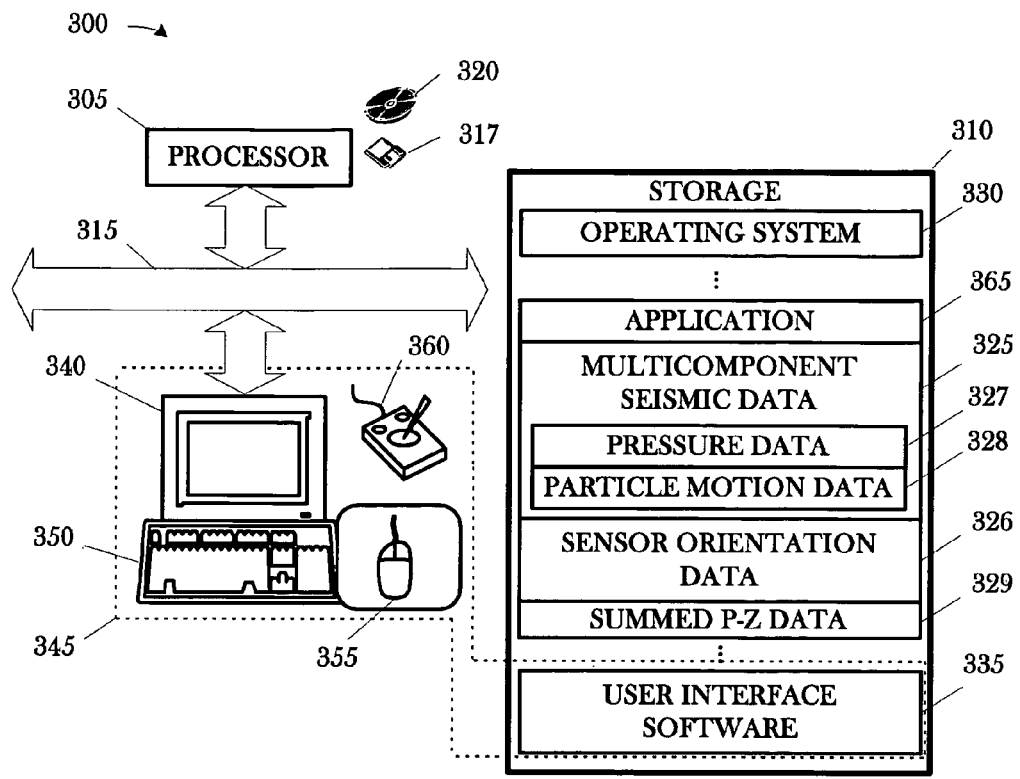
FIG. 3 shows selected portions of the hardware and software architecture of a computing apparatus such as may be employed in some aspects of the present invention.

FIG. 3 shows selected portions of the hardware and software architecture of a computing apparatus 300 such as may be employed in some aspects of the present invention. The computing apparatus 300 includes a processor 305 communicating with storage 310 over a bus system 315. The storage 310 may include a hard disk and/or random access memory ("RAM") and/or removable storage such as a floppy magnetic disk 317 and an optical disk 320.

The storage 310 is encoded with the multicomponent seismic data 325 and the sensor orientation data 326. The multicomponent seismic data 325 may have been previously acquired in any suitable manner known to the art. The multicomponent seismic data 325 includes both pressure data 327 and particle motion data 328. Note that the multicomponent seismic data 325 and the sensor orientation data 326 are digital at the time they are stored on the storage 310. In the particular embodiment disclosed below, the data is digital at the point of acquisition. However, the point of digitization may vary depending on the implementation. The data may therefore be digital upon output from the sensors by which it is acquired or by conversion after output and prior to storage. The multicomponent seismic data 325 and the sensor orientation data 326 may be stored using any suitable data structure known to the art.

The storage 310 is also encoded with an operating system 330, user interface software 335, and an application 365. The user interface software 335, in conjunction with a display 340, implements a user interface 345. The user interface 345 may include peripheral I/O devices such as a keypad or keyboard 350, a mouse 355, or a joystick 360. The processor 305 runs under the control of the operating system 330, which may be practically any operating system known to the art. The application 365, when invoked, performs the method of the present invention, e.g., the method 100 of FIG. 1. The user may invoke the application in conventional fashion through the user interface 345.

Figure 4A:
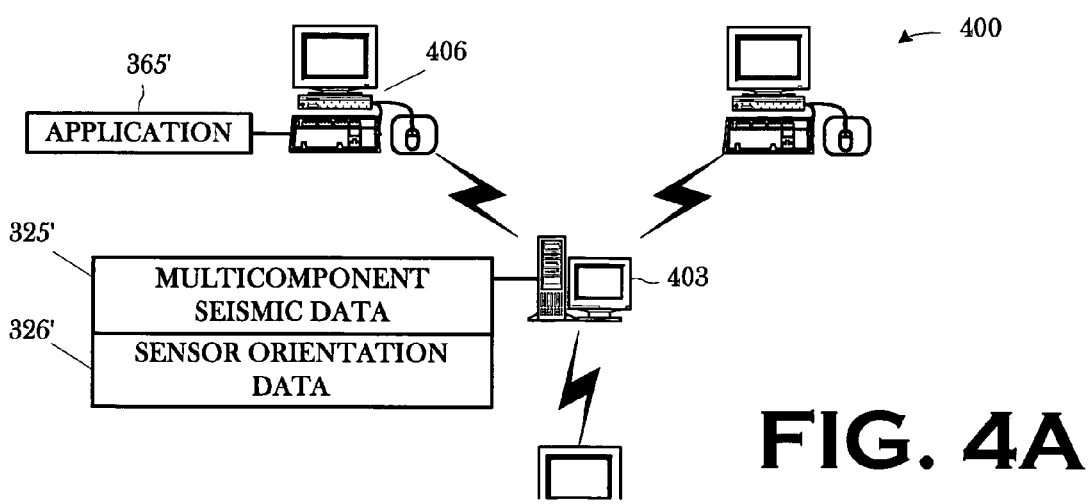
FIG. 4A-FIG. 4C depict alternative computing systems on which some aspects of the present invention may be practiced in some embodiments.

Note that there is no need for the multicomponent seismic data 325 to reside on the same computing apparatus 300 as the application 365 by which it is processed. Some embodiments of the present invention may therefore be implemented on a distributed computing apparatus. Consider, e.g., the computing system 400 in FIG. 4A, comprising more than one computing apparatus. For example, the multicomponent seismic data 325 may reside in a data structure residing on a server 403 and the application 365' by which it is processed on a workstation 406 where the computing system 400 employs a networked client/server architecture. Furthermore, although the multicomponent seismic data 325 is shown residing on the server 403 with the sensor orientation data 326, there is no requirement that they reside together.

However, there is no requirement that the computing system 400 be networked. Alternative embodiments may employ, for instance, a peer-to-peer architecture or some hybrid of a peer-to-peer and client/server architecture. The size and geographic scope of the computing system 400 is not material to the practice of the invention. The size and scope may range anywhere from just a few machines of a Local Area Network ("LAN") located in the same room to many hundreds or thousands of machines globally distributed in an enterprise computing system.

Figure 4B:
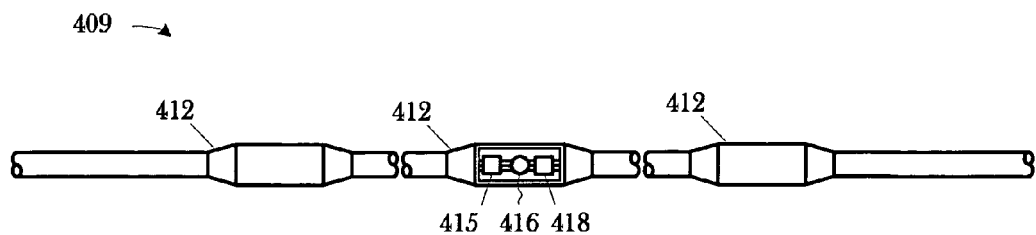
Figure 4C:
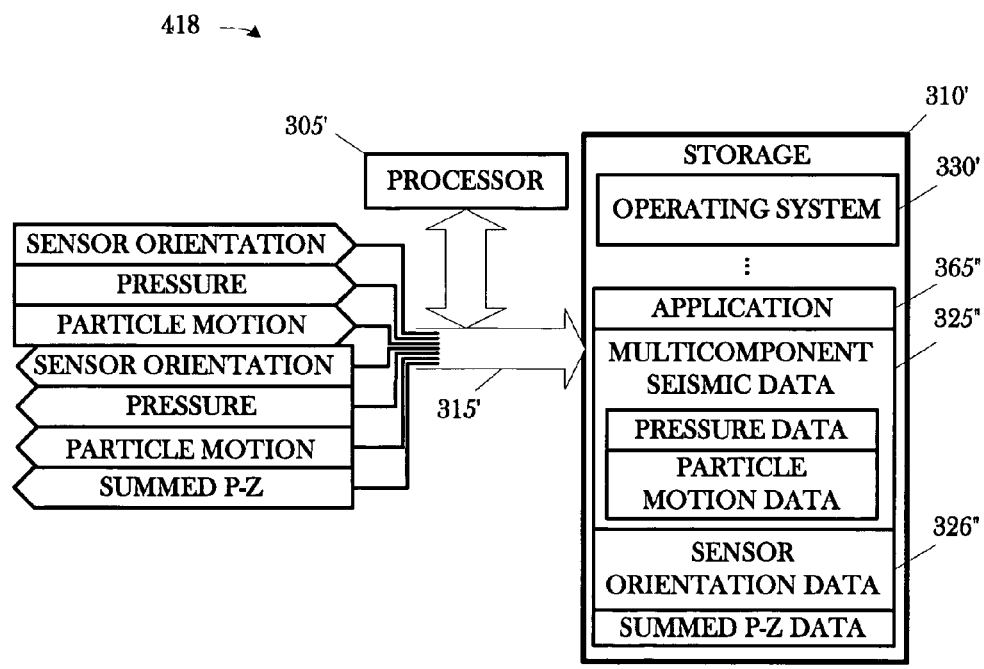

Such a distributed computing system may even be implemented in the streamer in some embodiments. For instance, consider the streamer 409 in FIG. 4B. The streamer 409 includes a plurality of instrumented sondes 412. Each instrumented sonde 412 includes sensors 415, 416 for acquiring the multicomponent seismic data 325 and the sensor orientation data 326, both shown in FIG. 3, respectively. Each instrumented sonde 412 also includes a computing element 418, shown in greater detail in FIG. 4C. The application 365" is invoked by the OS 330' on power up, reset, or both. As the multicomponent seismic data 325" and sensor orientation data 326" are acquired, the application 365" pre-processes it in accordance with the present invention. Thus, the computing is distributed along the streamer 409 rather than being centralized in FIG. 4A or distributed across a land-based computing system as in FIG. 4B.

Figure 5:
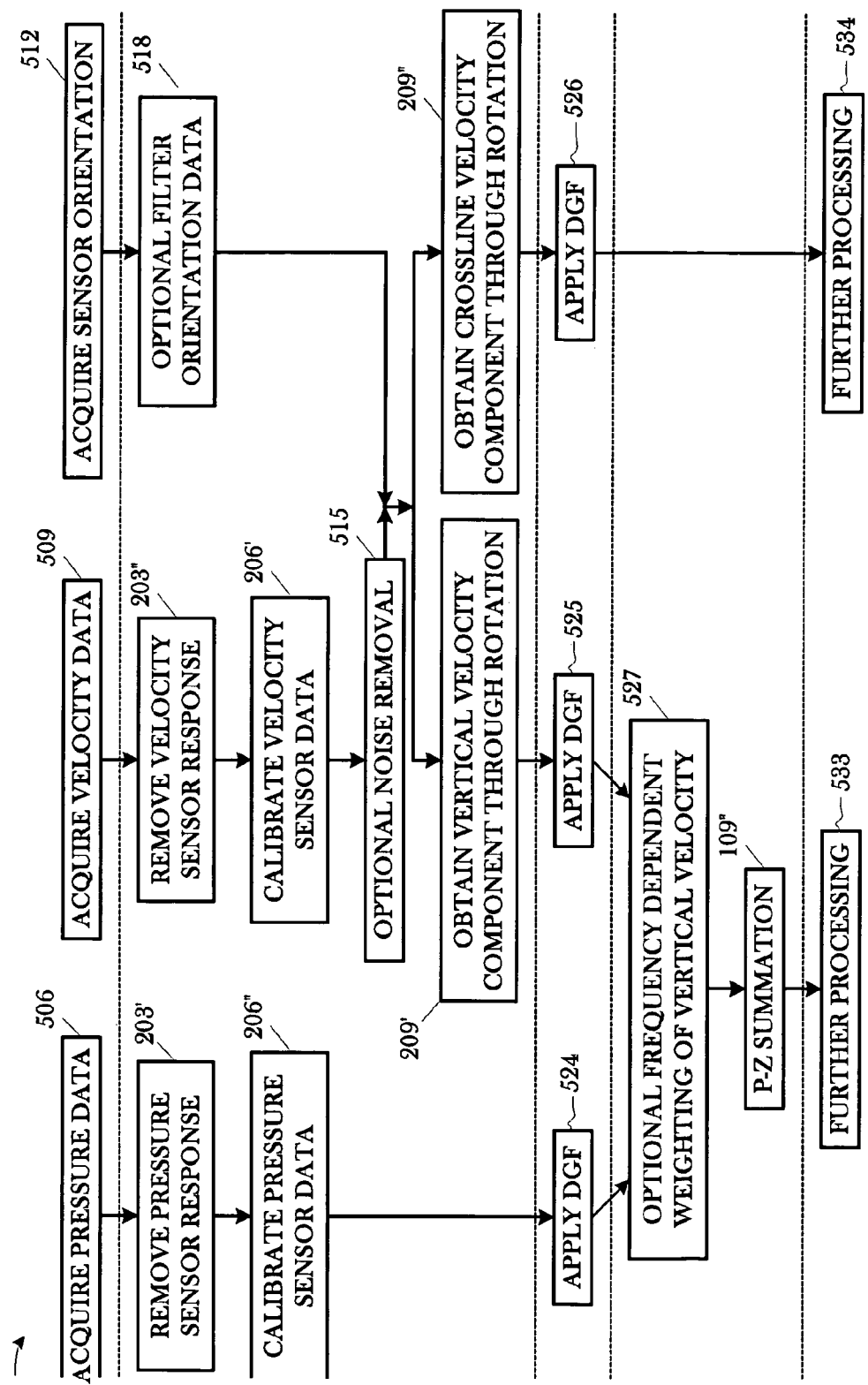
FIG. 5 illustrates one particular embodiment of the method first shown in FIG. 1.
Figure 6A:
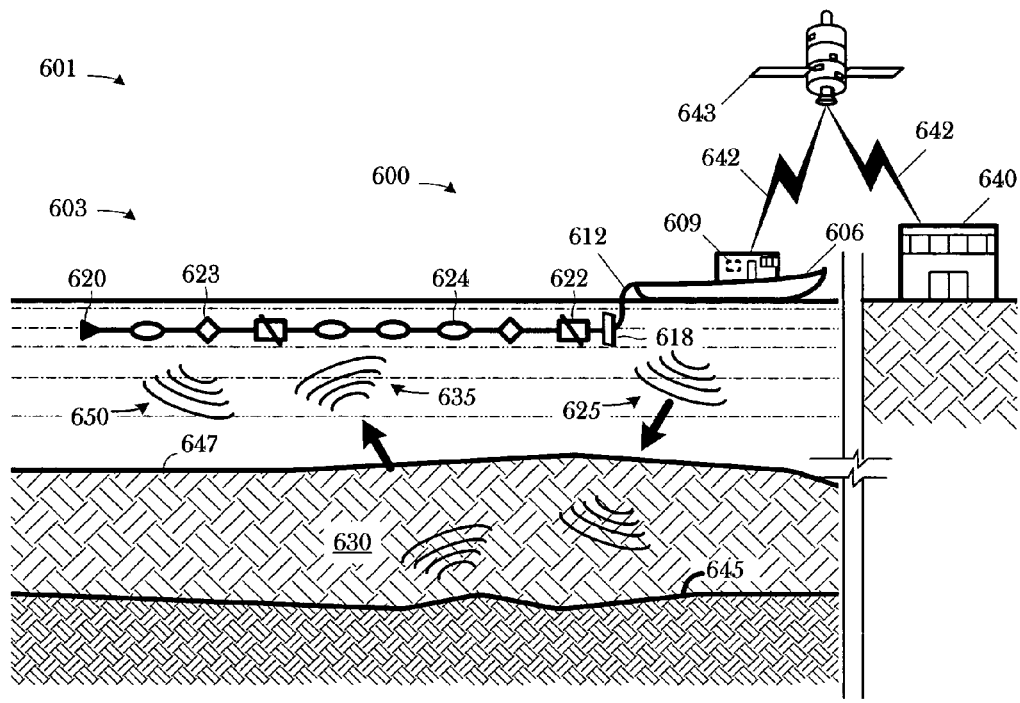
FIG. 6A-FIG. 6B depict a towed array, marine seismic survey practiced in accordance with one aspect of the present invention.
Figure 6B:
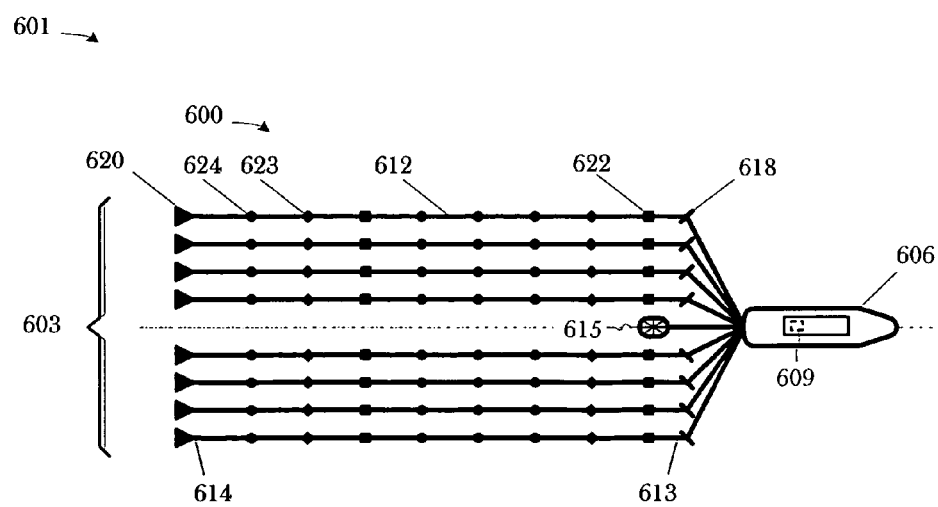

To further an understanding of the present invention, one particular implementation 500, shown in FIG. 5, of the embodiment disclosed above will now be discussed. The method 500 begins by first acquiring (at 503) the multicomponent seismic data, which includes acquiring pressure data 327 (at 506), velocity data (at 509), and sensor orientation data 326 (at 512). FIG. 6A and FIG. 6B illustrate a towed array survey system 600 in a towed array marine survey 601, both of which are exemplary embodiments of their respective aspects of the present invention, with which such an acquisition may be performed, as will now be discussed.

As a preliminary matter, note that, in this particular embodiment, the particle motion data 328 that is acquired is velocity data, or the particle displacement of the passing wavefront. This is but one type of the particle motion data 328 suitable for use in the present invention. Alternative embodiments may, for instance, acquire the acceleration of the passing wavefront, i.e., the time derivative of the particle displacement. Other quantities may be also be suitable for use in the present invention, as well. Note further that some embodiments may acquire one type of the particle motion data 328 and convert it in processing to use another. Thus, some embodiments might acquire the velocity data, process it to take the time derivative, and then use the acceleration data in the rest of the method of the invention. Or, some embodiment might acquire the acceleration, integrate it over time to get the velocity, and then use the velocity data in the rest of the method.

Referring now to FIG. 6A and FIG. 6B, in this particular embodiment, the survey system 600 generally includes an array 603 towed by a survey vessel 606 on board of which is a computing apparatus 609. The towed array 603 comprises eight marine, towed seismic cables, or streamers, 612 (only one indicated) that may, for instance, each be 6 km long. Note that the number of streamers 612 in the towed array 603 is not material to the practice of the invention. Thus, alternative embodiments may employ different numbers of streamers 612. In some embodiments, the outermost streamers 612 in the array 603 could be, for example, 700 meters apart.

A seismic source 615 is also shown being towed by the survey vessel 606. Note that, in alternative embodiments, the seismic source 615 may not be towed by the survey vessel 606. Instead, the seismic source 615 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 615 may be implemented using any such source known to the art. In the illustrated embodiment, the seismic source 615 comprises an air gun or an array of air guns At the front of each streamer 612 is a deflector 618 (only one indicated) and at the rear of every streamer 612 is a tail buoy 620 (only one indicated). The deflector 618 laterally, or in the crossline direction, positions the front end 613 of the streamer 612 nearest the survey vessel 606. The tail buoy 620 creates drag at the tail end 614 of the streamer 612 farthest from the survey vessel 606. The tension created on the streamer 612 by the deflector 618 and the tail buoy 620 results in the roughly linear shape of the streamer 612 shown in FIG. 6A.

Located between the deflector 618 and the tail buoy 620 are a plurality of seismic cable positioning devices known as "birds" 622. The birds 622 may be located at regular intervals along the seismic cable, such as every 200 to 400 meters. In this particular embodiment, the birds 622 are used to control the depth at which the streamers 612 are towed, typically a few meters. In one particular embodiment, the steerable birds 618 are implemented with Q-fin™ steerable birds as are employed by Western Geco, the assignee hereof, in their seismic surveys.

The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Øyvind Hillesund et al. However, any type of steerable device may be employed. For instance, a second embodiment is disclosed in PCT International Application No. WO 98/28636, entitled "Control Devices for Controlling the Position of a Marine Seismic Streamer", filed Dec. 19, 1997, in the name of Geco AS as assignee of the inventor Simon Bittleston. In some embodiments, the birds 618 may even be omitted.

The streamers 612 also include a plurality of instrumented sondes 624 (only one indicated) distributed along their length. The instrumented sondes 624 may be of any suitable construction known to the art and house the sensors (discussed more fully below) used to acquire (at 503) the data. The sondes 624 are distributed in a manner that permits them to densely sample in the inline direction, e.g., 0.5 m-10 m apart. The sondes 624 may be regularly or irregularly distributed. In the illustrated embodiment, the sondes 624 are regularly distributed and are spaced 3.125 meters apart and studies indicate that separations smaller than 0.5 m may be suitable.

Figure 7:
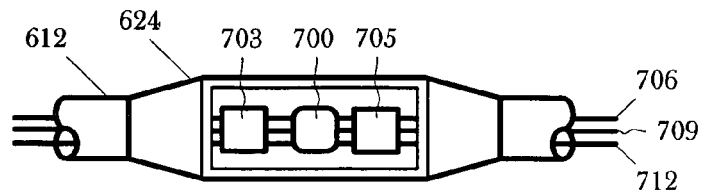
FIG. 7 conceptually depicts one particular sensor arrangement for the seismic survey of FIG. 6A and FIG. 6B.

The instrumented sondes 624 house, in the illustrated embodiment, an acoustic sensor 700, a particle motion sensor 703, and an orientation sensor 705, as is conceptually shown in FIG. 7. The acoustic sensor 700 may implemented using, e.g., a hydrophone such as is known to the art. The acoustic sensor 700 acquires the "pressure data" 327 indicating the magnitude and time of arrival for passing wavefronts in a conventional manner well known to the art.

The particle motion sensors 703 measure not only the magnitude of passing wavefronts, but also their direction. The particle motion sensor 703 may be implemented using, for example, at least two co-located sensors in different (preferably orthogonal) directions in the plane perpendicular to the inline axis of the streamer 612. Suitable particle motion sensors are disclosed in:

U.S. application Ser. No. 10/792,511, entitled "Particle Motion Sensor for Marine Seismic Sensor Streamers," filed Mar. 3, 2004, in the name of the inventors Stig Rune Lennart Tenghamn and Andre Stenzel (published Sep. 8, 2005, as Publication No. 2005/0194201);

U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341); and U.S. Pat. No. 3,283,293, entitled "Particle Velocity Detector and Means for Canceling the Effects of Motional Disturbances Applied Thereto," naming G. M. Pavey, Jr. et al. as inventors, and issued Nov. 1, 1966.

Any suitable particle motion sensor known to the art may be used to implement the particle motion sensor 703. Thus, it would be possible to distinguish data representing upwardly propagating wavefronts, such as the reflections 635, from the downwardly propagating wavefronts, such as the multiple reflection 650.

As noted elsewhere, particle velocity is but one vector quantity associated with the passing wavefront that may be used. Thus, in some embodiments, instead of the particle velocity, the particle acceleration may be measured using a suitable accelerometer. Suitable accelerometers include geophone accelerometers ("GACs"), such as are commonly known in the art for use in land-based seismic surveying, or micro electromechanical systems ("MEMS") accelerometer. Suitable MEMS accelerometers are known to the art. For example, MEMS accelerometers are disclosed in:

U.S. Pat. No. 5,723,790, entitled "Monocrystalline Accelerometer and Angular Rate Sensor and Methods for Making and Using Same", issued Mar. 3, 1998, and naming Gert Andersson as inventor ("the '790 patent")

U.S. patent application Ser. No. 11/042,721, entitled "System and Method for a Three-Axis MEMS Accelerometer", filed Jun. 24, 2005, published Jul. 28, 2005, as Publication No. 2005/0160814 A1, and naming Vladimir Vaganov and Nikolai Belov as inventors;

U.S. patent application Ser. No. 11/000,652, entitled "Micro-Machined Electromechanical System (MEMS) Accelerometer Device Having Arcuately Shaped Flexures", filed Nov. 30, 2004, published Sep. 15, 2005, as Publication No. 2005/0202585 A1, and naming Mark H. Eskridge as inventor; and International Patent Application Serial No. PCT/GB2004/001036, entitled "MEMS Accelerometers", filed Mar. 11, 2004, published Sep. 25, 2004, as Publication No. WO 2004/081583, and naming Diana Hodgins and Joseph Mark Hatt as inventors.

However, any suitable accelerometer known to the art may be used.

The streamer 612 also provides a way to measure or detect the orientation of the particle motion sensors 703 with respect to the sea-surface or gravity field. The particle motion sensor 703 is ideally oriented to measure in the "true" vertical direction. However, this is frequently not the case, as the streamers 612 can rotate and twist during the seismic survey 600. It is therefore desirable to know the true orientation of the particle motion sensor 703 relative to the vertical so that a correction may be effected during processing. This may be done using inclinometers, for example. The inclinometer may be a single and/or dual axis accelerometer formed on an integrated circuit chip, such as the ADXL 103/203 single/dual axis accelerometer produced by Analog Devices or that disclosed in U.S. application Ser. No. 10/623,904, entitled "Cable Motion Detection", filed Jul. 21, 2003, in the name of Kenneth E. Welker and Nicolas Goujon, and commonly assigned herewith. Alternatively, the DC component from MEMS sensors in embodiments where MEMS sensors are used. Note that this means, in embodiments using MEMS sensors, there may not be a separate orientation sensor 705.

Some embodiments may employ additional sensors over and above those shown. Some embodiments may employ a third sensor to measure the inline particle velocity. If a third particle motion sensor measuring the inline particle velocity is present an extra inclinometer measuring the inline angle of the sensor with respect to the sea-surface is included.

In general, it is desirable for the measurements of the particle motion sensors 703 be taken as close to the point the seismic data is acquired by the acoustic sensors 700 as is reasonably possible to reduce preprocessing. However, it is not necessary that the particle motion sensor 703 be positioned together with the acoustic sensor 700 within the sensor sonde 624 as is the case for the illustrated embodiment. Alternative embodiments may position the particle motion sensors 703 on the streamer 612 without regard to the positions of the acoustic sensors 700, even to the extent that the two groups of sensors may employ different inline spacings along the streamer 612. In these circumstances, vertical motion data can be interpolated inline during processing using techniques known to the art.

The sensors of the instrumented sondes 624 then transmit data representative of the detected quantity over the electrical leads of the streamer 612. The data from the acoustic sensors 700, the particle motion sensors 703, and the sensor orientation sensors 705 may be transmitted over separate lines. However, this is not necessary to the practice of the invention. Size, weight, and power constraints will typically make separate lines desirable. The data generated will therefore need to be interleaved with the seismic data. Techniques for interleaving information with this are known to the art. For instance, the two kinds of data may be multiplexed. Any suitable technique for interleaving data known to the art may be employed.

Referring now to FIG. 6A-FIG. 6B and FIG. 7, the data generated by the sensors of the instrumented sondes 624 is transmitted over the seismic cable to the computing apparatus 609. As those in the art will appreciate, a variety of signals are transmitted up and down the streamer 612 during the seismic survey. For instance, power is transmitted to the electronic components (e.g., the acoustic sensor 700 and particle motion sensor 703), control signals are sent to positioning elements (e.g., the deflectors 618, birds 622), and data is transmitted back to the survey vessel 610. To this end, the streamer 612 provides a number of lines (i.e., a power lead 706, a command and control line 709, and a data line 712) over which these signals may be transmitted. Those in the art will further appreciate that there are a number of techniques that may be employed that may vary the number of lines used for this purpose. Furthermore, the streamer 612 will also typically include other structures, such as strengthening members (not shown), that are omitted for the sake of clarity.

The survey system 600 employs what is known in the art as "point receiver recording", or "single sensor acquisition." In point receiver recording, the s sensors are not hard-wired into groups as has historically been the practice. Instead, they are individually wired so that the individual data traces recorded by each receiver are recorded and are available for processing. As those in the art having the benefit of this disclosure will appreciate, this will impact the implementation of the streamer 612. Point receiver recording also allows the use of digital group-forming for better noise attenuation and signal preservation, discussed further below. It is also possible to vary the size and composition of the groups formed in the digital group-forming process.

The survey vessel 606 tows the array 603 across the survey area in a predetermined pattern. The predetermined pattern is basically comprised of a plurality of "sail lines" along which the survey vessel 606 will tow the array 603. Thus, at any given time during the survey, the survey vessel 606 will be towing the array 603 along a predetermined sail line 653. The seismic source 615 generates a plurality of seismic survey signals 625 in accordance with conventional practice as the survey vessel 606 tows the array 603. The seismic survey signals 625 propagate and are reflected by the subterranean geological formation 630. The geological formation 630 presents a seismic reflector 645. As those in the art having the benefit of this disclosure will appreciate, geological formations under survey can be much more complex. For instance, multiple reflectors presenting multiple dipping events may be present. FIG. 6A-FIG. 6B omit these additional layers of complexity for the sake of clarity and so as not to obscure the present invention. The sensors 700, 703 detect the reflected signals 635 from the geological formation 630 while the sensor 705 detects the sensor's orientation relative to the gravitational field or water surface.

The sensors 700, 703 (shown in FIG. 7) in the instrumented sondes 624 then generate data representative of the reflections 635, and the seismic data is embedded in electromagnetic signals. The sensor 705 generates data representative of their orientation. The signals generated by the sensors 700, 703, and 705 are communicated to the computing apparatus 609. The computing apparatus 609 collects the data for processing. The computing apparatus 609 is centrally located on the survey vessel 610. However, as will be appreciated by those skilled in the art, various portions of the computing apparatus 609 may be distributed in whole or in part, e.g., across the seismic recording array 605, in alternative embodiments.

The computing apparatus 609 may process the seismic data itself, store the seismic data for processing at a later time, transmit the seismic data to a remote location for processing, or some combination of these things. Typically, processing occurs on board the survey vessel 606 or at some later time rather than during the seismic survey 600 because of a desire to maintain production. The data may therefore be stored on a portable magnetic storage medium (not shown) or wirelessly transmitted from the survey vessel 606 to a processing center 640 for processing in accordance with the present invention. Typically, in a marine survey, this will be over satellite links 642 and a satellite 643. Note that some alternative embodiments may employ multiple data collection systems 620.

Returning to FIG. 5, the implementation 500 then conditions (at 103') the acquired multicomponent seismic data 325 and sensor orientation data 326. In the illustrated embodiment, the conditioning (at 103) includes correcting (at 203', 203") the multicomponent seismic data 325 for sensor response, calibrating (at 206', 206") the particle motion data 328 and the pressure sensor data, and rotating (at 209', 209") the particle motion data 328 using the sensor orientation data 326 to obtain the vertical and crossline velocity components, respectively. This particular implementation also includes optional noise removal (at 515, 518) in the particle motion data 328 and sensor orientation data 326, respectively. Each of these acts, as performed in the implementation 500, will now be discussed.

A correction is applied (at 203', 203") to the pressure data 327 and the particle motion data 328 for the instrument response of the particle motion sensors 703 and the pressure sensors 700. Such a correction may be performed through deconvolution. Alternatively, the velocity sensor response may be removed and the pressure sensor response may be applied. Such calibration techniques for instrument response are known to the art in the context of seabed surveys using ocean bottom cables ("OBCs"). Consider, for instance, the techniques disclosed in Dellinger, Joe, et al., "Horizontal Vector Infidelity Correction by General Linear Transform," SEG Technical Program Expanded Abstracts pp. 865-868 (2001); Bagaini, C., and Muyzert, E., "Calibration of Cross-Line Components for 4C Seabed Acquisitions," 52 Geophysical Prospecting 1-9 (2004). Such calibration techniques can be applied to the pressure data 327 and the particle motion data 328 with little or no adaptation and will be well within the ordinary skill in the art.

In order to minimize the impact of differences in response between the different sensors and the noise behind the signal, the acquired particle velocity data and pressure sensor data is calibrated (at 206', 206") using sensor dependent calibrations. This calibration addresses manufacturing uncertainties with respect to the sensors, and this approach calibrates the resultant data in processing rather than calibrating the sensors themselves. The calibration is carried out before any operation that involves combination of data from different sensors, such as rotation (at 209', 209"), PZ-combination (at 109"), or DGF at 524).

The two or three co-located particle motion sensors should be calibrated with respect to each other, the neighboring hydrophone and other sensors present in the streamer. Suitable calibration filters may be scalar or frequency dependent and can be derived in many different ways. and may be based on measurements derived during manufacturing or during the survey, including:

using predetermined filters stored in erasable, programmable, read-only memories ("EPROMS") in the recording system;
  using filters derived from system checks such as analyzing step responses of the sensors in the streamer;
  using wave equation based methods such as the ones outlined by U.S. application Ser. No 10/501,271, entitled, "PZ Calibration Using Critically Refracted Waves", filed Jan. 9, 2002, in the name of the inventors D. J. Van Manen and A. H. Stroemmen-Melboe Muijs, R., et al., "Data-Driven Adaptive Decomposition of Multicomponent Seabed Recordings," 73rd Annual Society of Exploration Geophysicists ("SEG") Meeting (Dallas 2003); Robertsson, J. O. A., and Kragh, E., "Rough Sea Deghosting Using A Single Streamer And A Pressure Gradient Approximation", Geophysics, 67, 2005-2011 (2002) or International Application WO 2004/029662A1, entitled, "Calibration of Multi-Component Recordings in the Common Shot Domain," filed Sep. 24, 2003, under the Patent Cooperation Treaty in the name of the inventors, J. O. A. Robertsson, et al. Stroemmen-Melboe, A. H., J. O. A. Robertsson, and D. J. Van Manen, "PZ Calibration Using Critically Refracted Waves," 72nd Annual Society of Exploration Geophysicists (SEG) Meeting, Salt Lake City (2002); and Schalkwijk, K., 2001, "Decomposition Of Multi-component Ocean-Bottom Data Into P- And S-Waves": Ph.D. thesis, Delft University, Netherlands; and using cross-ghosting techniques such as the ones proposed by Ball, V. L. and Corrigan, D., "Dual Sensor Summation of Noisy Ocean-Bottom Data," 66$^{th}$ Ann. Intl. Mtg.: SEG, 28-31 (2002).

Still other approaches and filters may become apparent to those skilled in the art having the benefit of this disclosure and may be employed in various alternative embodiments.

The illustrated embodiment performs an optional noise removal (at 515, 518) in the particle motion data 328 and sensor orientation data 326 prior to rotating (at 209', 209"). It may be desirable to attenuate noise on the particle velocity data and pressure data 327 prior to the rotation. Noise may be caused by bulge waves, swell noise, streamer vibrations. These types of noise are well known in the art, as are a number of filtering techniques that may be applied. Possible filters include bandpass, dip, or FK filters as are well know, as well as adaptive filters such as that described below of the digital group forming (at 106').

Next, the implementation 500 rotates (at 209', 209") the particle motion data 328 and the sensor orientation data 326 to obtain the vertical and crossline velocity components, respectively. A single value for the streamer rotation angle may be obtained for each trace varying with shot and sensor. Alternatively, a time variant rotation angle can be obtained and the trace is rotated with time dependent rotation angles. It may be desirable to filter the orientation data to remove outliers that are not in agreement with the understanding of the shape and motion of the streamer. Using the orientation data, the particle velocity sensor data is rotated in the plane perpendicular to the streamer axis so that the vertical component of the velocity field is obtained. The crossline component of the velocity field is also derived at 209" at this time in this particular embodiment. (Note that not all embodiments will necessarily drive the crossline component.) Suitable rotation techniques are well known to the art in the context of seabed surveys using OBCs and can be applied in this context with little or no adaptation. Such application will be well within the ordinary skill in the art.

Sensor to sensor sensitivity variations will lead to errors in the rotated data. The rotation operation is decribed by:

$$y'_i(t) = -A_i \cos \phi_i y_i(t) + B_i \sin \phi_i z_i(t)$$

$$z'_i(t) = -A_i \sin \phi_i y_i(t) + B_i \cos \phi_i z_i(t) \quad (1)$$

where $A_i$ a scalar representing the sensitivity variation of the $i^{th}$ y-component velocity/acceleration sensor before rotation while $B_i$ a scalar representing the $i^{th}$ z-component velocity/acceleration sensor sensitivity variation before rotation. A rotation angle $\phi_i$ derived from for instance inclinometer data at the same receiver station.

One method to solve for the calibration coefficients $A_i$ and $B_i$ is now described. First we select from a data the first break, seabottom reflection, early first arrival, or other window with a clear signal. The position of the airgun with respect to the streamer is not important for the method. The selected data are rotated with $A_i=1$ and $B_i=1$. Next we apply time-shifts to the rotated waveforms so that the rotated waveforms from different stations align and calculate the average or mean of the rotated $\bar{y}'_i$ and $\bar{z}'_i$ traces. This average trace may be calculated over all available traces, or a subset in the vicinity of the $i^{th}$ receiver station, e.g., seven traces including the 3 traces before and after the $i^{th}$ receiver station. It may also be beneficial to apply an amplitude correction to each individual waveform before calculating the average trace as a way to compensate for the difference in propagation distance.

Next we solve the system of equations for $A_i$ and $B_i$ using the derived average rotated traces $\bar{y}'_i$ and $\bar{z}'_i$.

$$\bar{y}'_i(t) = -A_i \cos \phi_i \bar{y}_i(t) + B_i \sin \phi_i \bar{z}_i(t)$$

$$\bar{z}'_i(t) = -A_i \sin \phi_i \bar{y}_i(t) + B_i \cos \phi_i \bar{z}_i(t) \quad (2)$$

This set of equations may be solved for one time sample, e.g., at the peak amplitude, or for a number of timesamples of the selected time window. The set of equations can be solved for each $i^{th}$ station separately or for a number of stations simultaneous. Various ways to solve this linear system of equations are available for instance through the least squares method, see for instance *Numerical Recipes, the Art of Scientific Computing*, Press, Flannery, Teulkolsky, Vetterling, Cambridge University Press, 1986.

More precise sensitivity values may be obtained through a second iteration. A new average trace is calculated using the previous derived $A_i$ and $B_i$ that are now typically different from unity and Eq. (2) is solved again. This process can be repeated even more is desired.

In order to solve for $A_i$ and $B_i$ at least two independent sets of measurements are required. This may be achieved using different time samples. An alternative method to obtain another set of independent measurements is by rotating the streamer through adjusting the birds and deflector a nd record another shot. This results in a second set of measurement and corresponding equations that can be used to solve for the calibration coefficients:

$$\bar{y}'_i(t) = -A_i \cos \phi_i \bar{y}_i(t) + B_i \sin \phi_i \bar{z}_i(t)$$

$$\bar{z}'_i(t) = -A_i \sin \phi_i \bar{y}_i(t) + B_i \cos \phi_i \bar{z}_i(t)$$

$$\bar{y}'_{i2}(t) = -A_i \cos \phi_{i2} \bar{y}_{i2}(t) + B_i \sin \phi_{i2} \bar{z}_{i2}(t)$$

$$\bar{z}'_{i2}(t) = -A_i \sin \phi_{i2} \bar{y}_{i2}(t) + B_i \cos \phi_{i2} \bar{z}_{i2}(t) \quad (3)$$

We now describe an alternative approach to solve for the calibration coefficients. For this approach the streamer axis is positioned inline with the location of an airgun source but not necessary at the same depth. This can be achieved through laterally positioning the streamer using deflectors and birds. The direct wave and possibly the seabed reflection and other early arrivals from such an airgun shot recorded by the $i^{th}$ receiver station should not have energy in the direction transverse to the shot-receiver line. That is after rotation for the direct wave $y'_i(t)=0$. This results in:

$$-A_i \cos \phi_i y_i(t) + B_i \sin \phi_i z_i(t) = 0 \quad (4)$$

In order to solve for $A_i$ and $B_i$ at least two independent sets of measurements are required. This may be achieved by using different time samples. For two time samples one would solve:

$$-A_i \cos \phi_i y_i(t) + B_i \sin \phi_i z_i(t) = 0$$

$$-A_i \cos \phi_i y_i(t+dt) + B_i \sin \phi_i z_i(t+dt) = 0 \quad (5)$$

If necessary the streamer can be rotated around its axis and an additional set of measurements is obtained as previously described.

The derived calibration coefficients can now be stored and applied throughout the survey.

Returning to FIG. 5, the implementation 500 then applies (at 106') digital group forming ("DGF") to the conditioned pressure data 327 (at 524), the vertical velocity component of the conditioned particle motion data 328 (at 525), and the crossline velocity component (at 526). In the pursuit of improved signal-to-noise ratio, conventional acquisition systems rely on summing the responses from a large numbers of individual detectors before digitizing and recording. The response from such arrays is rarely optimal across a survey area, or from one prospect to the next. Noise attenuation is compromised and high signal frequencies are attenuated. The result can be masked structural features and poor resolution images. The single-sensor principle briefly mentioned above allows for individual detectors to be digitized and recorded separately. Single-sensor recording overcomes many of the limitations of analogue summation within conventional acquisition arrays. For example, at long offsets, traditional hydrophone arrays can act as a spatial filter and attenuate signal arriving along non-vertical raypaths.

This enables noise attenuation filters to be optimally designed for each dataset, and applied before group forming, i.e., DGF. Due to the high density spatial sampling, low frequency, low-velocity noise modes (e.g., streamer noise) can be attenuated without the effects of aliasing, and without the need to apply low-cut filters. In addition, applying intra-array statics enables the individual detectors to be group formed while preserving much higher frequencies than conventional systems allow. DGF improves the signal-to-noise ratio and broadens the recorded seismic data spectrum. The targeted noise attenuation within a DGF workflow can therefore more effectively remove environmental effects such as marine swell noise.

In general, digital group-forming consists of the application of a filter that allows much better control of the signal protection and noise rejection zones in the spectral domain. The filter may be either deterministic or adaptive. Suitable adaptive filters are disclosed in U.S. Pat. No. 6,446,008, entitled "Adaptive Seismic Noise and Interference Attenuation Method," issued Sep. 3, 2002, to Schlumberger Technology Corporation as assignee of the inventor Ali Ozbek ("the '008 patent") and International Application PCT/GB97/00055, entitled, "Noise Filtering Method for Seismic Data," filed Jan. 8, 1997, in the name of the inventor Ali Ozbek. However, any suitable method known to the art may be used to define the filter.

The natural data structures of the data input into the group-forming process are individual common source gathers. A common source gather is, as the name suggests, the ensemble of all point receiver recordings acquired following actuation of an individual seismic source. Common source gathers are well known to the art. In the digital group-forming process a digital group-forming filter is convolved with the point receiver data traces, and the output is a set of digital group-formed traces. Usually, the number of output traces will be far less than the number of original point receiver traces.

The DGF is applied (at 106') to the pressure data 327 (at 524) and the vertical and crossline components of the particle velocity data (at 525, 526), to remove non-seismic noise. Typically a number of traces are input (e.g., 7 neighboring traces) and a single filtered trace is output. Alternatively a filter (e.g., an fk-filter) is applied to all pressure data 327 from the streamer that removes the swell noise. One particular DGF technique is disclosed more fully below.

One DGF technique is disclosed and claimed in the '008 patent, fully cited above. This document is hereby incorporated by reference for all purposes as if expressly set forth verbatim herein. The filter is designed to be adaptive in those parts of f-k space that are occupied by noise components, while having no effect in areas where signal is present. Variations in the amplitude and phase characteristics of individual detectors are corrected before digital group forming. To further an understanding of the present invention, portions of this patent are excerpted immediately below.

In general, the technique is a method relating to filtering coherent noise and interference from seismic data by constrained adaptive beamforming. The technique uses a constraint design methodology which allows the imposition of an arbitrary predesigned quiescent response on the beamformer. The method also ensures that the beamformer response in selected regions of the frequency-wavenumber space is controlled by this quiescent response, hence ensuring signal preservation and robustness to perturbations. Built-in regularization brings an additional degree of robustness. Seismic signals with arbitrary spectral content in the frequency-wavenumber domain are preserved, while coherent noise and interference that is temporarily and spatially nonstationary is adaptively filtered.

More specifically, this DGF technique filters received signals using an at least partially adaptive filter such that signals having propagation characteristics other than the determined propagation characteristics are attenuated. The filter defines at least two independent sets of conditions, or constraints. A first set of constraints defines a desired, or quiescent, response. A second set of constraints defines the propagation characteristics of signals to be preserved. The filter also adapts filter coefficients of the filter subject to the independent sets of constraints so as to minimize, or optimize, the filter output for signals with propagation characteristics other than the determined propagation characteristics.

It is advantageous to define for the optimization process of the filter weights or coefficients a signal-dependent part (correlation matrix) and a signal-independent part. The signal-independent part usually comprises the constraints and is there often referred to as constraint matrix. Within the constraint matrix one subspace may be defined by the desired quiescent response and a second subspace may be defined the regions of the protected signal. By making these two subspaces orthogonal, filter weights can be found which simultaneously impose both restrictions upon the filter response.

As the constraint matrix effectively reduces the degrees of freedom of the filter available for the adaptation process, this aspect of the technique can be described as splitting the total number of degrees of freedom into a first part which is available for the adaptation process and a second part which is used to define the constraints. The degrees of freedom assigned to the constraints are split among those constraints which defines the desired response and a second set defining the temporal and/or spatial spectral content or the propagation characteristics of the signals to be preserved.

As was noted above, the data sampling along the streamer 612, shown in FIG. 6A, may be regular or irregular in various alternative embodiments. However, the design of multi-dimensional filters used for digital group-forming typically assumes regular sampling of the seismic data. "Regular sampling" in this context means, for example, spatial sampling of seismic data at locations arranged on a regular grid such as a rectangular or a hexagonal grid, although other regular grid patterns can be used as well. The sampling along the time axis is also assumed to be regular.

Sometimes, in a real seismic survey, the seismic wavefield is often sampled at locations that are spatially irregular and do not lie on a regular grid. This may be caused by environmental factors, such as wind, currents, and tides, causing sensors to be at positions other than those desired at the time of acquisition. This may also result from irregular construction or assembly of the towed array. Seismic data is therefore available for points that are irregularly distributed.

The fact that data points are not regularly distributed is usually ignored in the design and application of multi-dimensional filters for group-forming. However, the irregular spacing can sometimes have adverse effects. For instance, the actual response of the DGF filter can sometimes be different from the theoretical response of the filter. The signal pass zone of the filter in the spectral domain can be distorted, so that the pass zone may be smaller than designed, the gain may end up being significantly different from unity, and the phase may end up being significantly different from zero. The side-lobes of the filter (i.e., the gain in the reject zone) may be significantly increased. This can lead to distortion of the seismic signal and to noise leakage.

Consequently, some embodiments may choose to apply the DGF technique such as that disclosed in U.S. Pat. No. 6,651,007, entitled "Adaptive Seismic Noise and Interference Attenuation Method", issued Nov. 18, 2003, to Schlumberger Technology Corporation as assignee of the inventor Ali Ozbek and U.S. Pat. No. 6,446,008, entitled "Adaptive Seismic Noise and Interference Attenuation Method", issued Sep. 3, 2002, to Schlumberger Technology Corporation as assignee of the inventor Ali Ozbek. These patents are hereby incorporated by reference for all purposes as if expressly set forth verbatim herein. To further an understanding of the present invention, portions of the '007 patent are excerpted herein.

Figure 8:
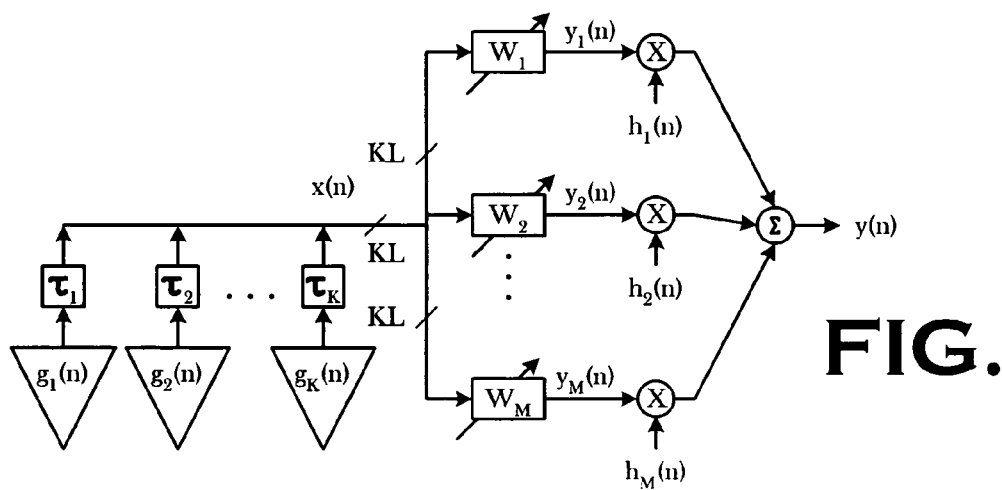

Referring now to FIG. 8, there is shown general block diagram of an adaptive beamformer as may be used in digital group forming in one particular embodiment. It is assumed the presence of K sensors located at $r_k$ with $k=1, \ldots, K$. Each sensor k records a signal $g_k(n)$ with $n=1, \ldots, N$, where n indexes discrete time samples. The sampling interval is $\Delta t$. The signals $g_k(n)$ are beamsteered using delays $\tau_k$ towards a general "signal direction". This is the general direction from which the seismic signals are expected to arrive. The beamsteered channels $x_k(n)$ are processed by local multi-channel adaptive filters to produce the output signal:

$$y(n) = \sum_{i=1}^{M} \sum_{k=1}^{K} \sum_{v=-L_1}^{L_2} h_i(n) w_{ikv} x_k(n-v) \quad (6)$$

where:
$w_{ik}v(t)$=the adjustable coefficients of the adaptive filters,
$h_i(n)$=the windows applied at the output end,
M=the number of local multichannel adaptive filters (or the number of output windows), and
$L=L_1+L_2+1$=the number of coefficients per channel.

Here and below, a bar under a letter denotes a vector (lower case letter) or a matrix (upper case letter).

Eq. (6) can be rewritten as a (windowed) sum over a scalar product using a tap-input vector x(n) at time t defined as:

$$\underline{x}(n) = [x_1(n+L_1), \ldots, x_1(n-L_2), x_2(n+L_1), \ldots, x_2(n-L_2), x_K(n+L_1), \ldots, x_K(n-L_2)]^T \quad (7)$$

and a tap-weight vector $w_i$ defined as $$\underline{w}_i = [w_{i1(-L_1)}, \ldots, w_{i1L_2}, w_{i2(-L_1)}, \ldots, w_{i2L_2}, w_{iK(-L_1)}, \ldots, w_{iKL_2}]^T \quad (8)$$

Using Eq. (7) and Eq. (8), Eq. (6) becomes $$y(n) = \sum_{i=1}^{M} h_i(n) \underline{w}_i^T \underline{x}_k(n) = \sum_{i=1}^{M} h_i(n) \underline{x}^T(n) \underline{w}_i. \quad (9)$$

Eq. (6) and Eq. (9) describe how to find the beamformer or filter bank output once the M tap-weight vectors $w_i$ have been specified. These vectors are computed as the solution of an optimization problem which is described below.

The optimization problem is defined as $$\min_{\underline{w}_1, \ldots, \underline{w}_M} J = \min_{\underline{w}_1, \ldots, \underline{w}_M} \left\{ J_1 + \frac{\delta^2}{KL} J_2 \right\} \quad (10)$$

subject to constraints $$C^T \underline{w}_i = f \quad (11)$$

where $i=1, 2, \ldots, M$ and $$J_1 = \sum_{n=1}^{N} y^2(n) \quad (12)$$

$$J_2 = \sum_{i=1}^{M} \|\underline{w}_i\|^2 \sum_{n=1}^{N} h_i(n) \|\underline{x}(n)\|^2, \quad (13)$$

KL is the total number of filter coefficients, and $\|\cdot\|$ denotes the $L_2$ norm. This cost functional is a linear combination of the output power of the beamformer (the first term in Eq. (10)), and the so-called "white-noise gain" of the beamformer weighted by the input power (the second term in Eq. (10)). The relative weight of the two terms is adjusted by the $\delta^2$ term. Including the "white-noise gain" of the beamformer in the cost functional is intended to increase the beamformer robustness in the presence of signal modeling uncertainties (sometimes called perturbations,) and numerical correlation between the signal and the noise.

Eq. (11) describes Q linear constraints on the admissible solutions to the optimization problem. Here, the KL×Q matrix C is the constraint matrix, and the Q-vector f is the response vector. The actual design of the linear constraints are discussed below.

A possible solution of the optimization depends on imposing the following two constraints on the window functions $h_i(n)$:

$$\sum_{i=1}^{M} h_i(n) = 1 \qquad (14)$$

for n=1,2, ..., N, and $$h_i(n)h_j(n)=0 \qquad (15)$$

for j<>i−1, i, i+1. The first constraint ensures that the filter bank is equivalent to the single filter case if all the local filters ($w_i$) are identical. The second constraint ensures that the windows have compact support.

The optimization problem can be to a large extend decoupled using the second condition (Eq. (15)), and the approximation $$\sum_{n}\sum_{i}\sum_{j=i-1,i+1} h_i(n)h_j(n)\underline{w}_i^T \underline{x}(n)\underline{x}^T(n)\underline{w}_j \approx \qquad (16)$$
$$\sum_{n}\sum_{i}\sum_{j=i-1,i+1} h_i(n)h_j(n)\underline{w}_i^T \underline{x}(n)\underline{x}^T(n)\underline{w}_i.$$

The approximation of Eq. (16) requires that neighboring filters produce similar results when applied to the same input data in time regions where adjacent windows overlap, instead of requiring that neighboring filters are similar on a point-by-point basis. Thus, the approximation is similar to requiring that the integral of two functions are close, rather than the functions themselves.

With this approximation, the first term of the cost functional, $J_i$, becomes $$J_1 = \sum_{i=1}^{M} \underline{w}_i^T \Phi_i \underline{w}_i \qquad (17)$$

with $$\Phi_i = \sum_{n} h_i(n)\underline{x}(n)\underline{x}^T(n). \qquad (18)$$

The second term in the cost functional can be rewritten as:

$$J_2 = \sum_{i=1}^{M} \|w_i\|^2 tr\left\{\sum_{n=1}^{N} h_i(n)\underline{x}(n)\underline{x}^T(n)\right\}, \qquad (19)$$

with "tr" denoting the trace of a matrix.

Combining Equations (10), (17), (19), and reorganizing the terms, the total cost functional can be written as:

$$J = \sum_{i=1}^{M} \underline{w}_i^T \left\{\Phi_i + \frac{\delta^2}{KL} tr(\Phi_i) \underline{I}\right\} \underline{w}_i, \qquad (20)$$

where I denotes the KL×KL identity matrix. The decoupled optimization problem can be solved for each of the M time windows subject to the constraints of Eq. (11). Using the method of Lagrange multipliers, the optimal tap-weight in each window is given by $$w_i^* = \Phi_i^{-1} C(C^T \Phi_i^{-1} C)^{-1} f, \qquad (21)$$

with $$\Phi_i^- = \Phi_i + \frac{\delta^2}{KL} tr(\Phi_i) I, \qquad (22)$$

The second term of the modified local correlation matrix $\Phi_i^-$ can be regarded as a regularization term with $\delta^2$ as the regularization parameter. In array signal processing literature, regularization of correlation matrices with the addition of a scaled identity matrix has been suggested to increase robustness in the presence of perturbations, in the context of narrow-band beamforming. Here, the cost functional in Eq. (10) includes the regularization term from the beginning leading to a generalization for wide-band adaptive beamforming. Hence, the filter response changes as a function of the frequency of the signal.

When the input data to the beamformer is characterized by spatially and temporally uncorrelated (or white) noise, both the correlation matrix $\Phi_i$ and the modified correlation matrix $\Phi_i^-$ become proportional to the identity matrix. In this case, the optimal weight vector becomes $$w_i^* \equiv w_q = C(C^T C)^{-1} f \qquad (23)$$

The weight vector $w_q$ is called the quiescent solution to the optimal beamformer problem, and the corresponding response is known as the quiescent response. Note that the quiescent solution depends entirely on the constraint matrix C and the response vector f.

The optimal weight vector $w_i$ approaches the quiescent weight vector $w_q$ even for general noise fields as the regularization parameter $\delta^2$ is increased. In this case, the modified correlation matrix $\Phi_i^-$ approaches the identity matrix (cf. (22)). The regularization parameter $\delta^2$ therefore weights the optimal solution between a solution that is entirely dependent on the received data, and a solution that is independent of the data. For $\delta^2=1$, both solutions are equally weighted in the sense that their corresponding correlation matrices have equal trace value. In situations where the perturbations are higher, i.e., the assumptions about the seismic acquisition geometry do not exactly hold, finding a beamformer response with a higher level of regularization can give more robust results.

One type of linear constraints that can be imposed on the beamformer are those designed to preserve seismic signals incident from a target direction, while suppressing interferences incident from other directions. Steering delays $\tau_k$ as those shown in FIG. 8 define a single "look-direction". Signals incident in this direction are in phase, and for these signals the system can be considered as a single finite impulse response ("FIR") filter. The values of the coefficients for this equivalent processor are equal to the sums of the corresponding coefficients in the adaptive processor. Each local beamformer $w_i$ consists of the adaptive filters $w_{i1}$, $w_{i2}$, $w_{ik}$ processing data from each channel, and a summing unit. The sum of the individual filters $w_{i1}$, $w_{i2}$, ..., $w_{ik}$ is constrained to give $w_{eq}$, which is the desired response for signals incident in the look-direction, e.g., a unit pulse in the look direction. The quiescent response then becomes that of a fixed-weight beamformer with single equal weights for all elements. In the frequency-wavenumber domain, this corresponds to a sync function that is constant in the f direction. Therefore, for increasing values of the regularization parameter $\delta^2$, the beamformer preserves signals incident not only from the look direction, but also from neighboring directions.

As discussed in the last section, using single look-direction constraints and regularization, it is possible to preserve signals incident from directions near the look direction. While this approach is useful and sufficient for many applications, it is desirable to derive more general linear constraints that will satisfy the requirements in any seismic data acquisition situation more directly.

In narrow-band beamforming, different generalized constraint design approaches are known. Derivative constraints are used to influence response over a region of the response space by forcing the derivatives of the beamformer response at certain points of the response space to be zero. Eigenvector constraints are based on a least squares approximation to the desired response, and are usually used to control the beamformer response over regions of the response space. Generalization of these methods to wide-band beamforming problems have shown that while they provide a good response in selected regions of the response space, they can generate unacceptably high sidelobes in other regions.

For this particular technique, the requirements of the generalized constraint design are to impose an arbitrary quiescent response on the beamformer and to make sure that certain areas in the frequency-wavenumber domain are entirely controlled by the quiescent response. These requirements have been established with the following functional objectives in mind:

- accommodation of an arbitrary range of apparent signal velocities;
- increased robustness to perturbations;
- capability to use larger arrays;
- being able to run the adaptive beamformer with a lower regularization level ($\delta^2$), hence achieving higher noise attenuation; and
- achieving higher noise attenuation for a given level of regularization by the appropriate design of the quiescent response.

To impose an arbitrary quiescent response on the beamformer, use can be made of the fact that the linear constraints of Eq. (11) define a Q-dimensional hyperplane in a KL-dimensional space. Eq. (23) shows that the quiescent weight vector $w_q$ is the minimum norm solution to Eq. (11), i.e., it is the shortest vector from the origin to the hyperplane.

Eq. (23) also shows that $w_q$ is a member of the subspace spanned by the columns of the constraint matrix C. The columns of C are in general independent (otherwise some constraints would be redundant), thus they can be chosen to be orthogonal without loss of generality. After defining a desired quiescent weight vector $w_{qd}$, this suggests the following forms for the constraint matrix C and the response vector f:

$$C=[\alpha w_{qd}, D] \quad (24)$$

and $$f=[_0^\beta] \quad (25)$$

with the condition $$\beta=\alpha\|w_{qd}\|^2 \quad (26)$$

where D is a KL×(Q-1) matrix whose columns are orthogonal to $w_{qd}$. The exact form of the matrix D is described below. With C and f chosen according to Eq. (24) and Eq. (25), respectively, it can be shown that the desired weight vector equals the quiescent response vector $w_q$ (Eq. (23)).

After defining the first column of the constraint matrix C and the response vector f to impose the quiescent weight vector, the definition of the matrix D which is a part of C is derived in the following sections.

Figure 9:
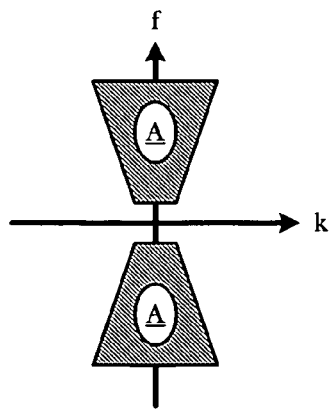

In a seismic acquisition, reflection signals that should be preserved can be considered as a linear combination of plane waves with associated frequency and wavenumber values from a known region of the frequency-wavenumber space. This region, which is denoted A in FIG. 9, depends on the particular acquisition geometry, but is usually a cone around the frequency axis. One possible example of a preserved region in the frequency-wavenumber domain is shown in FIG. 9, where A is chosen so as to include all signals of apparent velocity of ±1500 m/s or more. In the present example, the beamformer response in region A should be controlled entirely by a quiescent response which preserves the signal.

The set $S_A$ of seismic signals to be preserved by the filtering process is defined by $$S_A=\{s(t,r):s(t,r)=\int\int_A dfdk S(f,k)e^{j2\pi(ft-k\cdot r)}\} \quad (27)$$

as composites of plane waves with associated frequencies and wavenumber values from a region A, where S(f,k) is the complex Fourier amplitude corresponding to the plane wave component of a signal with frequency f and wavenumber k.

Using Eq. (27), the tap-input vector of Eq. (7) can be rewritten as $$s(n)=\int\int_{(f,k\in A)}dfdk S(f,k)e^{j2\pi f n\Delta t}d(f,k), \quad (28)$$

with d(f,k) being defined as the array steering vector corresponding to the plane wave component specified by particular frequency f and wavenumber k. It is noteworthy that in contrast to the example described above no time delays $\tau$ have been introduced into the signal path to steer the filter response. The array steering vector can be written as a Kronecker product:

$$\underline{d}(f,\underline{k})=\begin{bmatrix} e^{-j2\pi\underline{k}\cdot r_1} \\ e^{-j2\pi\underline{k}\cdot r_2} \\ \vdots \\ e^{-j2\pi\underline{k}\cdot r_k} \end{bmatrix} \otimes \begin{bmatrix} e^{j2\pi f L_1 \Delta t} \\ \vdots \\ 1 \\ \vdots \\ e^{-j2\pi f L_2 \Delta t} \end{bmatrix}. \quad (29)$$

Using Eq. (9), the response of the beamformer to the signal tap-input vector s(n) is $$y(n)=\sum_{i=1}^M h_i(n)\int\int_A dfdk S(f,\underline{k})^T e^{j2\pi f n\Delta t}\underline{d}^T(f,\underline{k})\underline{w}_i. \quad (30)$$

For the beamformer response to be the same for both the optimal weight vector $w_i$ and the quiescent weight vector $w_q$, and further requiring that this equality to hold for all signals s(t;r) of the preserved region, i.e., signals with arbitrary associated Fourier coefficients S(f,k) such that (f,k) is in A. This requires that $$d^T(f,k)w_i^*=d^T(f,k)w_q,\forall(f,k)\in A. \quad (31)$$

By decomposing the optimal weight vector into a fixed weight portion equal to the quiescent weight vector and an adaptive weight portion according to a solution known as "generalized sidelobe canceller" ("GSC"), it can be shown that the last equation is equivalent to requiring that d(f,k) lies in the column space of the constraint matrix C.

It is therefore desirable to find an efficient, i.e., preferably low rank, basis for the space of steering vectors d(f,k). However, a scalar multiple of $w_{qd}$ has already been installed as the first column of C, we actually need to find a low rank basis for the part of this space that lies in the orthogonal complement subspace of $w_{qd}$. The projection of d(f,k) onto the orthogonal complement of $w_{qd}$ is the projected steering vector:

$$d^-(f, k) \equiv (I - P_{w_{qd}}) d(f, k), \quad (32)$$

where the expression in parentheses is the orthogonal complement projector with respect to $w_{qd}$ with $$P_{w_{qd}} = w_{qd}(w_{qd}^T w_{qd})^{-1} w_{qd}^T \quad (33)$$

Using the fact that any KL-dimensional d(f,k) can be written as a linear combination of orthonormal vectors $\{v_1, \ldots, v_{XL}\}$, $$\tilde{d}(f, k) = \sum_{p=1}^{KL} \sigma_p(f, k) \underline{v}_p \equiv V \sigma(f, k), \quad (34)$$

a rank P (P<KL) approximation of the projected steering vectors is obtained by $$\tilde{d}_p(f, k) = \sum_{p=1}^{P} \hat{\sigma}_p(f, \underline{k}) \underline{v}_p \equiv V \hat{\sigma}(f, \underline{k}), \quad (35)$$

where $$\hat{\sigma}(f, k) = [\sigma_1(f, k), \ldots, \sigma_p(f, k), 0, \ldots, 0]^T \quad (36)$$

To derive an efficient rank P representation of d⁻(f,k) for any (f,k) in region A, an error functional with respect to the $L_2$ norm is defined as $$\mu_p = \int\int_A df d\underline{k} \|\underline{d}(f, \underline{k}) - \underline{d}_p(f, \underline{k})\|^2 \quad (37)$$

Using the correlation of all projected steering vectors in region A of the frequency-wavenumber space given by $$\tilde{R}_A = \int\int_A df d\underline{k} \underline{d}(f, \underline{k}) \underline{d}^H(f, \underline{k}) \quad (38)$$

the error functional can be expressed as $$\mu_P = \sum_{p=P+1}^{KL} \underline{v}_p^H \tilde{R} \underline{v}_p. \quad (39)$$

The superscript "H" denotes the conjugate transpose of a vector or matrix.

The optimum set of ordered basis vectors v can be found by minimizing the cost functional $\mu_p$ subject to the constraint that $v_p^H v_p = 1$, with $1 \leq p \leq KL$. Using Lagrange multipliers, the task is to minimize $$\sum_{p=P+1}^{KL} \left[ \underline{v}_p^H \tilde{R}_A \underline{v}_p - \lambda_p (\underline{v}_p^H \underline{v}_p - 1) \right]. \quad (40)$$

By taking the gradient with respect to $v_p$ and setting it to zero, the optimal basis vectors $v_1, \ldots, v_kL$ are found as the eigenvectors of $R_A^-$ (with respect to the eigenvalues $\lambda_p$). The missing part D of the constraints matrix C (cf. Eq. (24)) can now be defined as the principal eigenvectors of $R_A^-$:

$$D = [v_1, \ldots, v_p]. \quad (41)$$

Note that the steering vectors d(f;k) are in general complex valued. Therefore, their correlation matrix $R_A^-$ over a general region A in the frequency-wavenumber space is complex valued, making the eigenvectors of $R_A^-$ hence the columns of C also complex valued. However, in seismics the signals are real valued signals which have complex conjugate Fourier coefficients. Therefore the types of A regions that are of interest are always symmetric in the frequency-wavenumber space with respect to the origin. The resulting matrices ($R_A^-$, C) are then all real valued.

The above described expansion of the projected steering vectors d⁻(f;k) is analogous to the Rarhunen-Loeve expansion. While the original Karhunen-Loeve expansion is for a random vector, the expansion presented here is for a deterministic set of vectors. This is reflected in the way the approximation error functional $\mu_p$ is defined, cf. Eq. (37).

The covariance matrix of steering vectors, similar to the correlation matrices defined in Eq. (38) was first introduced in by K. M. Buckley, IEEE Trans. Acoust. Speech Signal Processing, Vol ASSP-35, 249-266, March 1987, but was then heuristically defined within a stochastic framework, assuming zero mean signals and using a narrow-band representation of wideband signals. In the description of this technique, the correlation matrix has been derived from first principles within a deterministic framework.

Figure 10:
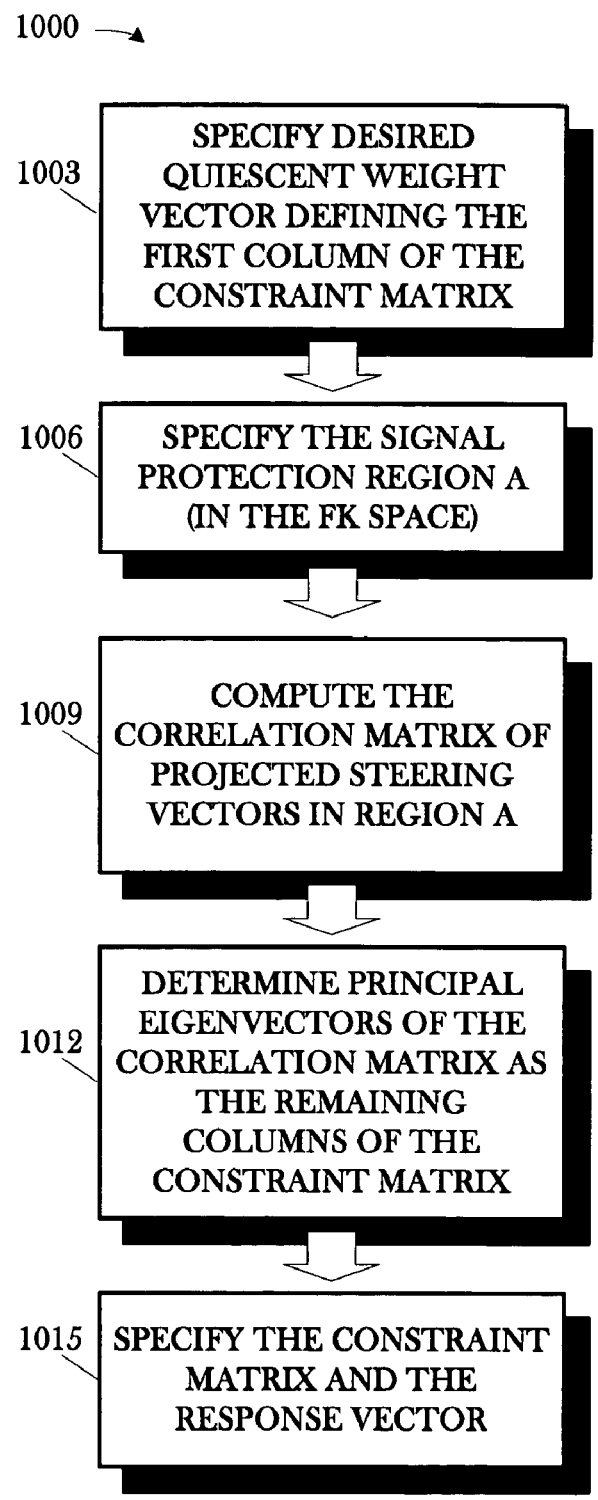

The main steps of the generalized constraint design method 1000 are shown in the flow diagram of FIG. 10, and include:

specifying (at 1003) the desired quiescent weight vector, $w_{qd}$, which defines the first column of the constraint matrix;

specifying (at 1006) the signal protection region A in the frequency-wavenumber space;

computing (at 1009) $R_A^-$, the correlation matrix of all the projected steering vectors in region A; and determining (at 1012) the principal eigenvectors $\{v_1, \ldots, v_kL\}$ of $R_A^-$ as the remaining columns of the constraint matrix.

Having computed these, the constraint matrix is specified (at 1015) as $$C = [w_{qd}/\|w_{qd}\|^2, v_1, \ldots, v_p] \quad (42)$$

and the response vector is specified (at 1015) as $$\underline{f} = \begin{bmatrix} 1 \\ \underline{0} \end{bmatrix}, \quad (43)$$

using a convenient choice for $\alpha$ and $\beta$ in Eq. (26).

The specification of the desired quiescent weight vector to form a desired quiescent response is essentially a nonadaptive multidimensional filter design problem, for which many techniques exist. Reference can be made for example to handbooks such as W. Chen (ed.), "The Circuits and Filters Handbook", IEEE and CRC Press, 2732-2761 (1995), D. E. Dudgeon and R. M. Martinez, "Multidimensional Digital Signal Processing", Prentice Hall (1984), or J. S. Lim, Two-Dimensional Signal and Image Processing, Prentice Hall (1990).

Note that other techniques for defining the region A may be employed, such as those disclosed in the '008 patent and not excerpted herein.

For some applications, it may be useful to reduce the degrees of freedom used by the adaptive beamformer. In the so-called partially adaptive beamformer, only a portion of the available degrees of freedom are used adaptively. The main advantages of reducing the adaptive degrees of freedom are reduced computational cost and improved adaptive convergence rate. The primary disadvantage of partially adaptive beamforming is a degradation in the steady state interference cancellation capability of the beamformer. Therefore, the objective of partially adaptive beamformer design is to reduce the number of adaptive weights without significantly degrading the performance of the adaptive array.

Previous partially adaptive methods includes numerical techniques for approximately minimizing the average generalized sidelobe canceller ("GSC") output power for a desired number of adaptive weights, where the average is over a range of jammer parameters. The present technique uses a method which is based on a design method described by H. Yang and M. A. Ingram, IEEE Trans. On Antennas and Propagation, Vol. 45, 843-850, May 1997. It also attempts to minimize the average GSC output power, but under a constraint that the reduced-dimensional solutions for all of the scenario trials lie in the same subspace. This constraint makes it possible to use a singular value decomposition to get the rank-reducing transformation, thereby simplifying the optimization problem.

The generalized sidelobe canceller solution can be written as (cf. Eq. (23)):

$$w_i^* = w_q - Bw_{ai}, \quad (44)$$

where B is a KL×(KL-Q) full rank matrix whose columns span the orthogonal subspace of the constraints matrix C and is known as the blocking matrix. The vector $w_{ai}$ is the KL×Q dimensional adaptive part of the optimal weight vector and is given by $$w_{ai} = (B^T\Phi_i B)^{-1} B^T \Phi_i w_q. \quad (45)$$

The partially adaptive GSC achieves a smaller number W of adaptive weights, through the use of a (KL-Q)×W linear transformation T following B prior to adaptive weighting. The partially adaptive optimal weight vector can be expressed as $$w_i^* = w_q - BTw_{pi}, \quad (46)$$

where the W-dimensional adaptive part of the optimal weight is $$w_{pi} = (T^T B^T \Phi_i BT)^{-1} T^T B^T \Phi_i w_q \quad (47)$$

It is now the aim to choose T which minimizes the interference and noise output power over a set of likely interference scenarios. These scenarios can be characterized by different parameters like the number of interferers, interferer directions, interferer spectral densities, white noise levels, etc. The applied method can be summarized as follows:

for each random outcome $\theta_j$ from a distribution of scenario parameters, compute the full-rank optimal adaptive weight vector $w_{ai}$ from Eq. (45) and the transformed weight vector α given by $$\alpha(\theta_j) = U\Sigma U^T w_{ai}(\theta_j), \quad (48)$$

where $$B^T \Phi_i(\theta_j) B = U\Sigma^2 U^T \quad (49)$$

is the eigen decomposition of $\Phi_i^-(\theta_j)$;

store vectors $w_{ai}(\theta_j)$ and $\alpha(\theta_j)$ into the matrices W and A, respectively;

compute the singular value decomposition of A to get $U_A$ from $$A = U_A \Sigma_A V_A^H; \quad (50)$$

and derive T as the first W columns of $WA^\# U_A$, where the superscript "#" indicates the pseudoinverse.

In most seismic surveys, the noise such as ground roll or swell noise occupies only a fraction of the temporal bandwidth available. For example in a land seismic survey, the Nyquist frequency is 250 Hz, while most of the ground roll energy is under 30 Hz. Concentrating filtering efforts to the frequency band where the noise resides is desirable to reduce computational cost.

One means of achieving this aim involves adding QMF (quadrature mirror filter) perfect reconstruction filter banks, described for example by P. P. Vaidyanathan, in "Multirate Systems and Filter Banks, Prentice Hall, 1993 or by M. J. T. Smith and T. P. Barnwell III, in: IEEE Trans. Acoust. Speech Signal Processing, Vol. ASSP-34, 434-441 (1986) to the seismic noise and interference suppression system using adaptive multichannel filter banks, as described above. Two filter banks are used in this system. The QMF filter bank is used to decompose the traces into frequency bands and decimate before adaptive filtering is applied, and is subsequently used for resynthesizing the original signal. The multichannel adaptive filter bank is the heart of the system performing the actual filtering for noise suppression. Using the perfect reconstruction filter banks to decimate reduces the number of points to be processed and also allows reduction in the number of coefficients in the adaptive filters, bringing in significant savings in CPU time and memory requirements.

The technique has been described above with reference to data that has been regularly sampled in time. The technique is not limited to this, however, and may be applied to data that is irregularly sampled in time as well as irregularly sampled in space.

Returning now to FIG. 5, once the DGF has been performed (at 106'), the pressure and vertical component data are summed (at 109). Such summations are commonly performed in the art, and this summation may be performed using any suitable technique known to the art. However, as previously noted, the implementation 500 subjects (at 527) the vertical velocity component to an optional frequency dependent weighting prior to the P-Z summation (at 109"). The recorded pressure data 327, or "$D_H$", in the vector sensing streamer 612, shown in FIG. 6A, at a sensor location x, consists of signal $S_H$ and noise $N_H$:

$$D_H(\omega, x_r) = S_H(\omega, x_r) + N_H(\omega, x_r) \quad (51)$$

Similarly the recorded particle motion data 328, or "$D_{PM}$" will also consist of signal and noise such that $$D_{PM}(\omega, x_r) = S_{PM}(\omega, x_r) + N_{PM}(\omega, x_r) \quad (52)$$

In general, the particle motion measurement will be a vector measurement in three dimensions such that $D_{PM}$, $S_{PM}$, and $N_{PM}$ will be three component vector quantities. However, one can also think of embodiments where only one or two of the components of the particle motion is recorded, for instance in the vertical plane to enable deghosting. Therefore, without further loss of generality, Eq. (52) will be treated as a scalar equation.

Note that both $N_{PM}$ and $N_H$ are functions of frequency and may have quite different character in different frequency bands. The present invention addresses the concern where the noise levels of the particle motion recordings $N_{PM}$ are so high in a certain part (or throughout all) of the frequency band that it actually degrades the pressure data 327 such that the end result even may become worse than processing the pressure data 327 only.

Depending on how noisy the particle motion data 328 is, its importance needs to be weighted before the combination with the pressure data 327. For example consider a case where the particle motion data 328 is extremely noisy below a certain frequency such that only the pressure data 327 are used below this "cut-off frequency", whereas above this frequency the pressure and particle motion data 328 are combined as normal. This embodiment can be used to perform the weighting of the particle motion data 328.

Knowledge of the streamer depth (and possibly the source signature), permits prediction of the "pseudo particle motion data" $\tilde{D}_{PM}$ from the pressure data 327 only. The vertical component of particle motion is computed using, e.g., single streamer deghosting techniques or by deconvolving the pressure ghost response from the pressure data 327 and then convolving the result with the particle motion ghost response. Suitable single streamer deghosting techniques are taught in Robertsson, J. O. A. and Kragh, E., "Rough Sea Deghosting Using A Single Streamer and a Pressure Gradient Approximation," 67 Geophisics 2005-2011 (2002); Amundsen, L. et. al., "Rough Sea Deghosting of Single Streamer Seismic Data Using Pressure Gradient Approximations," 70 Geophysics V1-V9 (2005).

The cross-line component can be estimated from the pressure data 327 using data from neighboring streamers 612 and a priori knowledge about Earth structure (e.g., radial symmetry). This can be done using conventional streamer data as recorded today that does not add very significant value to the seismic measurement. The "pseudo particle motion data" $\tilde{D}_{PM}$ can be regarded as:

$$\tilde{D}_{PM}(\omega, x_r) = \tilde{S}_{PM}(\omega, x_r) + F(\omega, x_r) N_H(\omega, x_r) \quad (53)$$

where $F(\omega, x_r)$ is a filter that compensates for different ghosts between particle motion and hydrophone recordings. The essential point is that signal-to-noise ratio is similar in Eq. (53) and Eq. (51) such that:

$$\frac{\tilde{S}_{PM}(\omega, x_r)}{F(\omega, x_r) N_H(\omega, x_r)} \approx \frac{S_H(\omega, x_r)}{N_H(\omega, x_r)}. \quad (54)$$

In other words, combining "pseudo particle motion data" $\tilde{D}_{PM}$ with the pressure data 327 does not alter signal-to-noise of the pressure data 327. However, on the other hand it does not add substantial value either, whereas combining with true particle motion data 328 does add value although it may degrade signal-to-noise.

Thus, a frequency dependent procedure is used to weight particle motion data 328 depending on how noisy it is before combining it with the pressure data 327. For each frequency, "effective particle motion data" $\hat{D}_{PM}$ is computed as follows:

$$\hat{D}_{PM}(\omega, x_r) = W(\omega, x_r) D_{PM} + [1 - W(\omega, x_r)] \tilde{D}_{PM} \quad (55)$$

where W is a weight between 0 and 1 which will be zero if $S_{PM}(\omega, x_r) = 0$ and 1 if S/N of the particle motion data 328 only is 3 dB lower than the S/N of the pressure data 327 (at least if the noise between the two measurements in uncorrelated). The factor "3 dB" arises from the fact that combining two measurements with uncorrelated noise will increase S/N by 3 dB. For completeness, one could also think of a (unlikely) scenario where the particle motion sensors are less noisy compared to the pressure sensors in which case a similar weighting should be done on the pressure side computing "pseudo pressure data".

The weight W can be computed in several different ways based on, for instance, noise recordings made at the beginning of a test or a line:

- by comparing noise levels for pseudo and real data;
- through Wiener deconvolution, which will provide a more efficient technique to properly weight the two data types given noise estimates; or
- with a probabilistic view point where the pseudo data are regarded as an a priori estimate of the real particle motion data 328 that should be properly combined with the measured data, as disclosed in MacKay, D. J. C., "Information Theory, Inference and Learning Algorithms, pp. 549-551 (2003).

Still other techniques may become apparent to those skilled in the art having the benefit of this disclosure.

Returning to FIG. 5, the resultant summed P-Z data 329 and orientation data can then be used in further processing (at 530). Further processing (at 533) for the summed P-Z data 329 might include techniques such as group forming, stacking, velocity analysis, moveout correction, time lapse analysis, multiple suppression, amplitude variation with offset ("AVO"), etc. Further processing (at 533') of the crossline component of the particle motion data 328 might include, for example, interpolation of the wave field between streamers 612. These techniques are well known in the art and are used to ultimately generate a representation of subterranean formations. The generated representation may be, for example, an image to be displayed, e.g., on the display 340 of the computing apparatus 300 in FIG. 3 or the workstation 406 in FIG. 4A.

Figure 11:
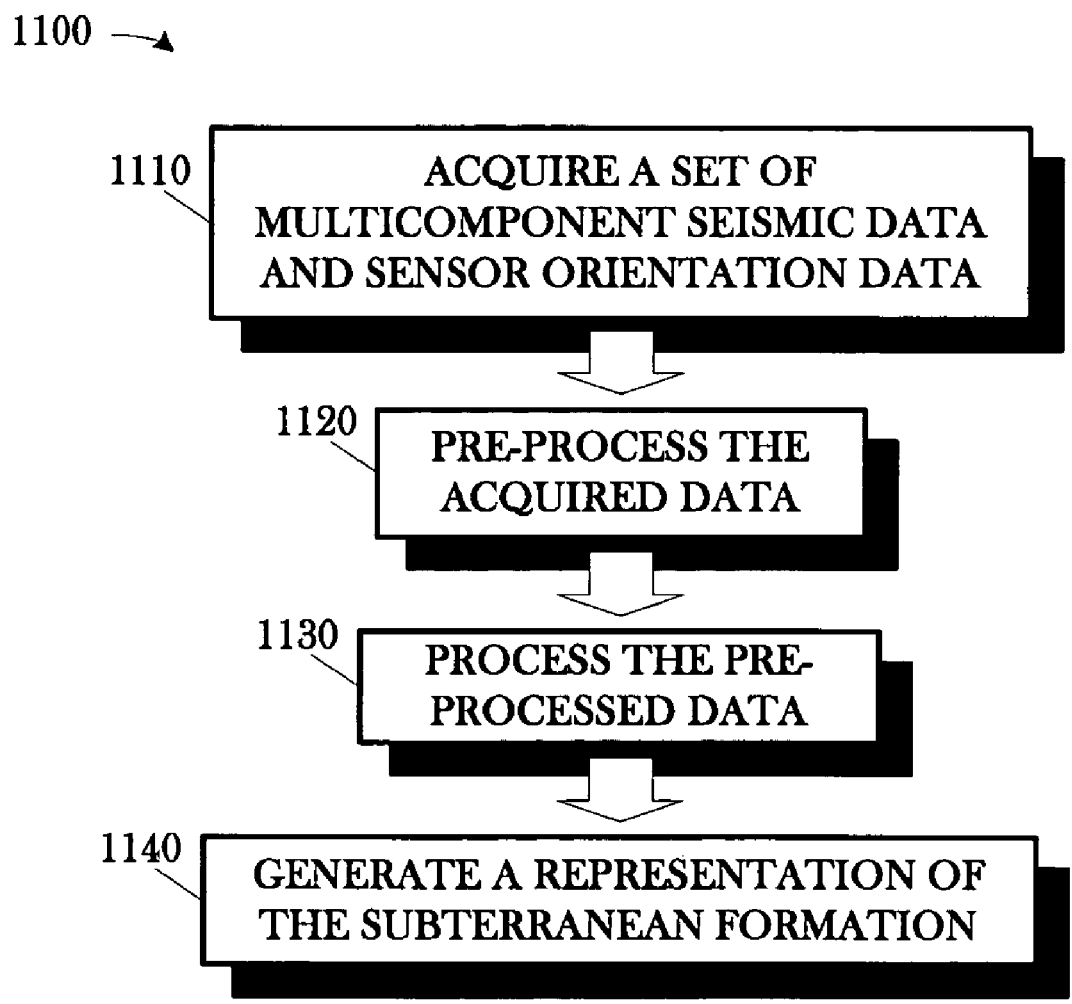
FIG. 11 illustrates the use of the method in FIG. 1 in a fuller context spanning from data acquisition through generation of a representation of the subterranean formation under survey.

Thus, in a fuller context, the invention is a part of a method 1100, shown in FIG. 11, comprising:

- acquiring (at 1110) a set of multicomponent seismic data and sensor orientation data 326, e.g., in a manner such as that shown in FIG. 6A-FIG. 6B;
- pre-processing (at 1120) the acquired data in accordance with the present invention, e.g., employing the method 100, shown in FIG. 1;
- processing (at 1130) the data pre-processed (at 1120) in accordance with the present invention; and
- generating (at 1140) a representation of the subterranean formation from the processed data.

The processing (at 1130) of the pre-processed data and the generation (at 1140) of the representation may be performed in accordance with conventional practice well known in the art. Accordingly, for the sake of clarity and so as not to obscure the present invention, details with respect to the processing and representation generation will be omitted.

Note, however, that the pre-processing (at 1120) in accordance with the present invention yields superior results when used in conventional processing (at 1130) and representation generation (at 1140) relative to conventional practice.

The embodiment disclosed above generally contemplates that the acquired data is pre-processed and/or processed off-board the survey vessel 606, e.g., at the processing center 640. One implication arising from this implementation is that the present invention may be applied to "legacy" data, i.e., data that has been previously acquired and archived for some time—provided that the requisite data is available. However, the invention is not limited to off-board processing. The acts described above from the calibration (at 206', 206" in FIG. 5) to the PZ summation (109", FIG. 5) may be carried out inside the streamer 612 (shown in FIG. 6A), e.g., at the A/D conversion, or in the computing apparatus 609 aboard the survey vessel 606 after receiving the data from the streamer 612 or storing and reading data back on the survey vessel 606, as well as after transferring the data to another location.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    conditioning a set of multicomponent seismic data and sensor orientation data, the multicomponent seismic data including pressure data and particle motion data, acquired in a towed array, marine seismic survey;
    digital group forming the conditioned pressure data, a vertical particle motion component of the conditioned particle motion data, and the conditioned sensor orientation data; and
    summing the digitally group formed pressure data and the digitally group formed vertical particle motion component.

2. The method of claim 1, wherein conditioning the acquired multicomponent seismic data includes:
    correcting the multicomponent seismic data for instrument response;
    calibrating the particle motion data; and
    rotating the particle motion data using the sensor orientation data to obtain the vertical particle motion component thereof.

3. The method of claim 2, wherein conditioning the acquired multicomponent seismic data includes filtering the particle motion data, the sensor orientation data, or both the particle motion data and the sensor orientation data for noise.

4. The method of claim 1, wherein conditioning the acquired multicomponent seismic data includes filtering the particle motion data, the sensor orientation data, or both the particle motion data and the sensor orientation data for noise.

5. The method of claim 2, wherein calibrating the particle motion data includes calibrating the acquired particle velocity data using sensor dependent calibrations.

6. The method of claim 2, wherein rotating the particle motion data includes obtaining a single value for the streamer rotation angle for each trace varying with shot and sensor.

7. The method of claim 2, wherein rotating the particle motion data includes:
    obtaining a time variant rotation angle; and
    rotating each trace with time dependent rotation angles.

8. The method of claim 2, wherein rotating the particle motion data includes filtering the sensor orientation data to remove outliers.

9. The method of claim 2, wherein rotating the particle motion data includes rotating the particle motion data in the plane perpendicular to the streamer axis to obtain the vertical component of the particle motion data.

10. The method of claim 2, wherein rotating the particle motion data includes deriving the crossline component of the particle motion data.

11. The method of claim 1, wherein the digital group forming includes applying a twodimensional, deterministic filter.

12. The method of claim 1, wherein the digital group forming includes applying a twodimensional, adaptive filter.

13. The method of claim 1, wherein the digital group forming includes applying a filter to pressure data that removes the swell noise.

14. The method of claim 1, further comprising frequency dependent weighting the vertical particle motion component prior to the summation.

15. The method of claim 1, further comprising further processing at the conditioned sensor orientation data, the summed pressure and vertical particle motion component data or both the conditioned sensor orientation data and the summed pressure and vertical particle motion component data.

16. The method of claim 1, further comprising acquiring the multicomponent seismic data.

17. The method of claim 16, wherein acquiring the particle motion data includes acquiring one of velocity data and acceleration data.

18. The method of claim 16, wherein acquiring the multicomponent seismic data includes a regularly spatially sampling, a regularly temporally sampling, or both a regularly spatially sampling and a regularly temporally sampling.

19. The method of claim 16, wherein acquiring the multicomponent seismic data includes of an irregularly spatially sampling, an irregularly temporally sampling, or both an irregularly spatially sampling and an irregularly temporally sampling.

20. A program storage medium encoded with instructions that, when executed by a computing device, perform a method comprising:
    conditioning a set of multicomponent seismic data and sensor orientation data, the multicomponent seismic data including pressure data and particle motion data, acquired in a towed array, marine seismic survey;
    digital group forming the conditioned pressure data, a vertical particle motion component of the conditioned particle motion data, and the conditioned sensor orientation data; and
    summing the digitally group formed pressure data and the digitally group formed vertical particle motion component.

21. The program storage medium of claim 20, wherein conditioning the acquired multicomponent seismic data in the encoded method includes:

correcting the multicomponent seismic data for instrument response;
calibrating the particle motion data; and
rotating the particle motion data using the sensor orientation data to obtain the vertical particle motion component thereof.

22. The program storage medium of claim 20, wherein the digital group forming in the encoded method includes applying a two-dimensional, deterministic filter.

23. The program storage medium of claim 20, wherein the digital group forming in the encoded method includes applying a two-dimensional, adaptive filter.

24. The program storage medium of claim 20, wherein the encoded method further comprises frequency dependent weighting the vertical particle motion component prior to the summation.

25. A computing apparatus comprising:
a processor;
a bus system;
a storage communicating with the processor; and
a software application residing on the storage that, when invoked by the processor, performs a method comprising:
conditioning a set of multicomponent seismic data and sensor orientation data, the multicomponent seismic data including pressure data and particle motion data, acquired in a towed array, marine seismic survey;
digital group forming the conditioned pressure data, a vertical particle motion component of the conditioned particle motion data, and the conditioned sensor orientation data; and
summing the digitally group formed pressure data and the digitally group formed vertical particle motion component.

26. The computing apparatus of claim 25, wherein conditioning the acquired multicomponent seismic data in the method includes:
correcting the multicomponent seismic data for instrument response;
calibrating the particle motion data; and
rotating the particle motion data using the sensor orientation data to obtain the vertical particle motion component thereof.

27. The computing apparatus of claim 25, wherein the digital group forming in the method includes applying a two-dimensional, deterministic filter.

28. The computing apparatus of claim 25, wherein the digital group forming in the method includes applying a two-dimensional, adaptive filter.

29. The computing apparatus of claim 25, wherein the method further comprises frequency dependent weighting the vertical particle motion component prior to the summation.

30. The computing apparatus of claim 25, wherein the computing apparatus comprises a computing system.

31. The computing apparatus of claim 25, further comprising the multicomponent seismic data, the sensor orientation data residing, or both the multicomponent seismic data and the sensor orientation data on the storage.

32. An apparatus, comprising:
a marine seismic streamer;
means for acquiring multicomponent seismic data and sensor orientation data along the marine seismic streamer, the multicomponent seismic data including pressure data and particle motion data; and
a computing system, including:
a processor;
a bus system; and
a storage communicating with the processor over the bus system, and on which resides:
the acquired multicomponent seismic data and sensor orientation data;
an application that, when invoked, pre-processes the acquired multicomponent seismic data and sensor orientation data, including:
conditioning a set of multicomponent seismic data and sensor orientation data, the multicomponent seismic data including pressure data and particle motion data, acquired in a towed array, marine seismic survey;
digital group forming the conditioned pressure data, a vertical particle motion component of the conditioned particle motion data, and the conditioned sensor orientation data; and
summing the digitally group formed pressure and vertical particle motion component.

33. The apparatus of claim 32, wherein conditioning the acquired multicomponent seismic data in the pre-processing includes:
correcting the multicomponent seismic data for instrument response;
calibrating the particle motion data; and
rotating the particle motion data using the sensor orientation data to obtain the vertical particle motion component thereof.

34. The apparatus of claim 32, wherein the digital group forming in the pre-processing includes applying a two-dimensional, deterministic filter.

35. The apparatus of claim 32, wherein the digital group forming in the pre-processing includes applying a two-dimensional, adaptive filter.

36. The apparatus of claim 32, wherein the pre-processing further comprises frequency dependent weighting the vertical particle motion component prior to the summation.

37. The apparatus of claim 32, wherein the computing apparatus comprises a computing system.

38. The apparatus of claim 32, further comprising the multicomponent seismic data, the sensor orientation data, or both the multicomponent seismic data and the sensor orientation data residing on the storage.

39. The apparatus of claim 32, wherein the acquisition means comprises a pressure sensor, a particle motion sensor, and an orientation sensor.

40. The apparatus of claim 32, wherein the acquisition means comprises a pressure sensor and two orthogonally oriented particle motion sensors.

* * * * *